US007929751B2

(12) United States Patent
Zhang et al.

(10) Patent No.: US 7,929,751 B2
(45) Date of Patent: Apr. 19, 2011

(54) METHOD AND APPARATUS FOR ABSOLUTE-COORDINATE THREE-DIMENSIONAL SURFACE IMAGING

(75) Inventors: Song Zhang, Ames, IA (US); Shing-Tung Yau, Cambridge, MA (US); Xianfeng Gu, Bethpage, NY (US); Yalin Wang, Tempe, AZ (US); Dale Royer, Somerville, MA (US)

(73) Assignee: GI, LLC, Somerville, MA (US)

( * ) Notice: Subject to any disclaimer, the term of this patent is extended or adjusted under 35 U.S.C. 154(b) by 283 days.

(21) Appl. No.: 12/084,799

(22) PCT Filed: Nov. 9, 2006

(86) PCT No.: PCT/US2006/043542
§ 371 (c)(1),
(2), (4) Date: Feb. 19, 2009

(87) PCT Pub. No.: WO2007/061632
PCT Pub. Date: May 31, 2007

(65) Prior Publication Data
US 2009/0238449 A1   Sep. 24, 2009

Related U.S. Application Data

(60) Provisional application No. 60/734,749, filed on Nov. 9, 2005.

(51) Int. Cl.
*G06K 9/00* (2006.01)

(52) U.S. Cl. ........................................ 382/154; 356/511
(58) Field of Classification Search .................. 382/154
See application file for complete search history.

(56) References Cited

U.S. PATENT DOCUMENTS

| | | | | | |
|---|---|---|---|---|---|
| 5,102,224 | A | * | 4/1992 | Uesugi et al. | 356/607 |
| 5,608,529 | A | * | 3/1997 | Hori | 356/609 |
| 5,668,631 | A | * | 9/1997 | Norita et al. | 356/608 |
| 5,736,958 | A | * | 4/1998 | Turpin | 342/179 |
| 6,788,210 | B1 | | 9/2004 | Huang et al. | |
| 7,079,666 | B2 | * | 7/2006 | Coulombe et al. | 382/154 |
| 7,433,058 | B2 | * | 10/2008 | Cantin et al. | 356/605 |
| 7,522,289 | B2 | * | 4/2009 | Cantin et al. | 356/512 |
| 2006/0077398 | A1 | * | 4/2006 | Cantin et al. | 356/512 |
| 2009/0238449 | A1 | * | 9/2009 | Zhang et al. | 382/165 |

FOREIGN PATENT DOCUMENTS

| | | |
|---|---|---|
| GB | 2204397 | 11/1988 |
| WO | 96/12160 | 4/1996 |

* cited by examiner

*Primary Examiner* — Sath V Perungavoor
(74) *Attorney, Agent, or Firm* — Occhiuti Rohlicek & Tsao LLP

(57) ABSTRACT

A method and associated apparatus for capturing an image of a 3D object (100) which encodes the surface geometry of at least a portion of the object, comprising: 1. projecting (304) a plurality of fringe patterns (312A, 314A) onto the object; 2. capturing (306) phase alterations in reflections of the fringe patterns (312B, 314B) from the object; 3. projecting a uniform image (310A) onto the object; 4. capturing a reflection of the uniform image (310B) from the object; and 5. combining (310) captured phase alterations and captured uniform image reflection on a pixel-by-pixel basis, thereby forming a holoimage representation of the object.

35 Claims, 26 Drawing Sheets

METHOD AND APPARATUS FOR ABSOLUTE-COORDINATE THREE-DIMENSIONAL SURFACE IMAGING

CROSS-REFERENCE TO RELATED APPLICATIONS

This applications claims the benefit, under 35 USC 119(e) of provisional U.S. Patent Application 60/734,749, filed Nov. 9, 2005 by Gu et al and titled "Holoimage," and of provisional U.S. Patent Application 60/841,840, filed Sep. 1, 2006 by Zhang and titled "3D Camera System and Method," which are hereby incorporated by reference in their entirety.

FIELD OF THE INVENTION

The present invention relates generally to a method and apparatus for absolute-coordinate three-dimensional surface imaging. More particularly, it relates to improved phase wrapping and unwrapping of an optical image to obtain surface contours. It further provides a novel method for creating, representing, storing and manipulating 3D geometric surfaces and images.

BACKGROUND OF THE INVENTION

The capture and representation of 3D geometric surface images is central to a number of image processing tasks, from animation to moviemaking to medical imaging. The traditional approaches to representing images of objects is based on the ability of the human eye and cameras to perceive amplitude of light. In one form or another, an amplitude map of light received at a camera serves as a representation of a captured image, which can then be processed, stored, transmitted, etc.

Likewise, computer-generated imagery for use in special effects and other computer graphics applications, such as animation, typically is based on amplitude representations of an image. These may be monochrome or color amplitude mappings. More recently, optical phase shifting techniques have been shown to advantageously provide high measurement resolution. Phase shifting techniques include generating phase-shifted optical fringe patterns, projecting the patterns onto a surface of an object, capturing images of reflections of the incident patterns as distorted by the surface of the object, and processing the reflected images to extract the phase of each of their pixels while removing phase discontinuities (a process called "phase unwrapping"). Following the phase unwrapping, absolute coordinates of the surface of the object are calculated from the derived phase information. The term "absolute coordinates" refers to the fact that the coordinates are based on a particular point of reference, which can be chosen arbitrarily. U.S. Pat. No. 6,788,210, incorporated herein by reference, discloses recent achievements in 3D surface contouring based on using phase shifting techniques.

Applications that depend on 3D surface measurement increasingly often require capturing the 3D geometry of objects very fast, to permit capture of dynamic changes of the surfaces of the objects, or to permit responsive action. As a case in point, in some areas of the entertainment industry, such as, for example, in computer animation and video games, an ability to capture and reproduce the 3D geometry of a face and/or body in real-time is desired. However, currently, 3D geometric motion capture requires attaching sensors to a subject (an actor, for example). This process is cumbersome and time-consuming, and the presence and size of the sensors limit the amount of detail that can be captured.

Similar problems exist in medical imaging, wherein not entirely portable and very slow three-dimensional scanners are employed. Usually, transporting the patient to the scanner is required. This is often a difficult experience for the patient who must sit completely motionless for a relatively long time, which, depending on the patient's condition, may be uncomfortable, painful, and even unrealistic. Capturing the 3D coordinates of the moving object without resorting to bulky sensors and in real-time would largely alleviate these serious shortcomings—at least for certain kinds of imaging needs (e.g., surface, not internal imaging). Real-time 3D surface measurement can potentially revolutionize some aspects of medical diagnostics and treatment. By analyzing real-time 3D measurements of moving human muscles, it may be possible to determine, for example, whether the muscles are affected by a certain disease or whether a nerve, rather then the muscles, causes the problem. By analyzing the motion of the chest, a pulmonary problem might be diagnosed. By analyzing the motion of the breast, a noninvasive diagnosis of certain conditions is conceivably possible. Real-time 3D scanning can also improve design of existing medical devices, such as X-ray or magnetic resonance imaging (MRI) machines, by providing feedback for determining whether the patient is positioned correctly during the scanning and imaging. Real-time 3D scanning can also be utilized in many homeland security applications as well as in scientific research and manufacturing (e.g., for quality control).

Phase shifting techniques applied to optical imaging depend (in the context of the invention), as the name implies, on generating and detecting phase shifts in optical signals. Historically, phase shifting of optical signals was achieved with mechanical gratings. More recently, a phase shifting technique has been developed wherein digitally-interpretable fringe pattern signals are generated electrically, converted electro-mechanically into optical phase-shifted fringe patterns (or images) and emitted via a projector.

Traditionally, in such a contour measuring optical system, at least three phase-shifted fringe patterns are shone on an object, with their reflections, together with an image of the object (i.e., a conventional amplitude image), being captured by a digital camera whose output is processed to obtain the 3D geometry data corresponding to the surface of the object. Increasing the number of phase-shifted images results in higher accuracy in the 3D geometry measurement. However, adding fringe patterns requires additional processing, which necessitates an increase in resources and time. The fewer the number of fringe images, the faster the speed that can be achieved. Real-time contour measurement is quite expensive with three or more phase-shifted images to be processed, and may not be realistic with commercially available projectors and cameras, and the processing required for contours to appear smooth to the human eye. (Reconstruction of a contour of an object is currently considered to be performed in real-time if the image acquisition speed is at least 30 frames per second, where a frame is a unique image.)

Furthermore, in many applications, it is desirable to be able to capture surface texture simultaneously with acquiring the 3D geometry. To obtain texture of acceptable quality when three phase-shifted fringe images are used, it is required that fringes have very precise phase shift and that the profiles of the fringes be ideally sinusoidal; otherwise, the quality of the captured texture may be compromised.

The speed of acquisition of the 3D geometry depends also on characteristics of the phase wrapping and unwrapping algorithms that are employed. The phase obtained from fringe images normally ranges from 0 to $2\pi$ radians. When multiple fringes are used, phase discontinuities occur every time the phase changes by 2π. Phase unwrapping is necessary to remove the 2π ambiguities on the wrapped phase image, thus obtaining a continuous phase map. A key to successful phase unwrapping is an ability to accurately detect and correct for the 2π discontinuities. For images with noise and images of complex geometric surfaces and surfaces with sharp edges, phase unwrapping is usually difficult. Various algorithms have been developed for phase unwrapping; however, they are generally too slow for capturing the 3D geometry in real-time and with reasonable cost.

Conventional phase unwrapping results in a relative phase map, or a relative phase unwrapped image, i.e. it does not refer to a point of reference. To obtain an absolute phase map, an absolute phase mark signal may be generated and projected onto the surface of the object, as described in U.S. Pat. No. 6,788,210. The absolute phase map is obtained from the relative phase map by subtracting the phase of the absolute phase mark from every pixel of the relative phase map. While this method is efficient, particularly when the absolute phase mark is a line, it requires taking an additional image of the mark on the object, which increases the processing requirements and correspondingly decreases the speed of the 3D geometry acquisition.

After the absolute phase has been obtained and a calibration has been carried out to establish relationships between a camera, projector, and a reference whose coordinates are known, absolute coordinates of the surface of the object can be determined. The calculations of the absolute coordinates are computationally intensive, and the process can therefore be a limiting step in performing real-time 3D surface measurement.

Conventionally, the captured absolute phase and amplitude information is then transformed into a mesh of triangles which provide piece-wise linear representation of the surface of the object but loose information that was present in the phase. Such a mesh is a common framework for the representation of surfaces in the field of computer graphics and in geometric as well as surface property modeling. Most graphics processors "expect" surfaces to be represented in this fashion. Likewise, computer-generated fabrications of images (e.g., in animation software) typically represent objects as meshes of small triangles representing spatial positions with only amplitude (e.g., color) information as textures. While mesh representations are convenient, they lack the fill information content of the phase information and require considerable memory.

In view of the aforesaid, there is a need for an accurate and fast absolute coordinate 3D surface imaging method and system and a better image representation format. Accordingly, the present invention was conceived at least partly with a goal of eliminating the above-described disadvantages of existing methods and systems, and example embodiments are directed to providing methods and apparatus to capture 3D geometry quite fast—preferably, in real-time, and to more efficiently and robustly representing 3D geometric surfaces.

SUMMARY OF THE INVENTION

In contrast with the prior art, phase imagery of an object can be combined with a traditional amplitude image including shading, texture and silhouettes. Either optically or via computer simulation, a fringe texture is projected by structured light onto an object (or simulated to be projected) and an actual or calculated reflection is captured, including both encoded phase information and shading (i.e., a conventional amplitude image). Through this unified representation, which is termed a "holoimage," both shading and 3D geometry can be recovered and maintained in a data model that can be readily displayed and manipulated.

Holoimages have the following advantages:

1. High Geometric Accuracy—Compared to conventional geometry images (i.e., a special form of meshes described in Gu, X. et al., "Geometry Images," *ACM SIGGRAPH* 2002, 355-361) and depth images, holoimages have much higher 3D accuracy for a like number of bits in the representation.

2. Efficient Mesh-Free Rendering—Holoimages represent both geometry and shading within the same image and can be rendered efficiently by modern graphics hardware without meshes. This not only makes more efficient use of modern graphics hardware, but also it has the potential to simplify the architecture of graphics processors.

3. High Acquisition and Processing Speed—Holoimages not only can be generated completely within a computer (i.e., "virtually"), but also can be captured from the real world using a simple arrangement of a projector and a camera. In the "virtual" type of implementation, a projector and camera are, in effect, simulated in a computer. Such simulation may be hardware or software based, or a mixed implementation. The reconstruction algorithms are simple enough to be automatically accomplished by modern graphics hardware (e.g., a commercial graphics processor unit, a GPU). A sequence of holoimages can be captured at the video frame rate for dynamic geometric data acquisition.

4. Uniform Representation—Holoimages allow image processing techniques to be applied in geometric processing, such as embossing and engraving, geometric texture extraction and deformation measurement. A holoimage can be very conveniently converted to and from other geometric representations (e.g., by hardware, automatically). Thus, one can avoid the need for processing meshes when holoimages are used, and any image from a library of mesh images, or any new mesh image, can be converted readily to a holoimage for further use.

SUMMARY OF THE INVENTION

Some embodiments of the present invention utilize an apparatus for absolute coordinate 3D surface measurement. The apparatus includes at least one signal generator, at least one projector, at least one camera, and at least one image processor.

The apparatus eliminates the elaborate, cumbersome and time-consuming setup process inherent in current methods. It is simply required that the subject be positioned in front of the camera; no sensors or makeup are necessary. A preferred camera is portable and operational wherever appropriate electrical power supply is available.

Embodiments of a 3D low-cost contour measurement system use for illumination two fringe patterns and preferably one uniform pattern. This is referred to as a "2+1" architecture. Other alternative phase-shifting arrangements can also be used to capture 3D geometry, but an advantage of using the 2+1 phase-shifting architecture is that it enables capture of high-quality texture simultaneously with the capture of the 3D geometry. Moreover, a small marker encoded in each of the patterns is also projected, as an aid to absolute phase and coordinate determination.

The patterns are generated by a signal generator, transduced, from an electrical to an optical form by any suitable mechanism, and projected through a light projection system. The illumination patterns are projected in a repeating sequence, and one or more cameras synchronized with the projector(s) capture the reflected patterns according to the sequence. The three images captured by the camera(s) are combined into a single image, called a wrapped phase image. The phase values in the wrapped phase range from 0 to $2\pi$ radians. Thus, the wrapped phase image contains discontinuities which reflect abrupt, beyond $2\pi$, changes in depth of the object's surface. To obtain a continuous phase map, a phase unwrapping algorithm is employed.

In some embodiments, a multi-level quality-guided algorithm may be used for phase unwrapping. First, a quality map is obtained from the wrapped phase image, using a variance or a gradient map of the wrapped phase image. The quality map is divided into multiple quality levels. The phase unwrapping, then, starts from higher quality-level data points and proceeds level-by-level to lower quality-level data points. In each level, a fast scan-line phase unwrapping algorithm is applied. Within each level, other, alternative phase unwrapping algorithms can also be utilized.

From the unwrapped relative phase image, an absolute phase map is obtained, by detecting the small marker previously encoded in each of the projected two fringe and one flat images. Finally, from the absolute phase map, the absolute coordinates are determined. Determination of the absolute coordinates involves intensive calculations, which makes it difficult to achieve real-time performance using only the Central Processing Unit (CPU) of existing desktop computers. In contrast, using a Graphics Processing Unit (GPU) in conjunction with the CPU can increase the processing speed dramatically. A GPU-assisted method for computing absolute coordinates in real-time is preferably used.

The present invention relates to capturing 3D geometry data in real-time. It should be understood that the term "real-time" is not precisely defined, since the claimed method provides the 3D absolute coordinates of dynamically changing surfaces of the objects with some small response time, the upper limit of which depends on the application. The inventors appreciate that the required frame rate should be fast enough to capture the motion of the object which can move at different speed, so that the absolute geometry data are available fast enough to avoid a delay in the availability of the data building up from the occurrence of motion of the object. Typically, a frame rate of 30 frames per second is sought.

In addition to the above embodiments, embodiments comprising computer-based implementations of the apparatus and method are possible, wherein software, or a combination of software and hardware, simulating functionality of the projector and camera, serves analogous purposes to those realized by their actual counterparts. According to these embodiments, a "virtual" apparatus generates a unified representation of a surface of a computer generated image or image of a real object that includes both phase information and texture, or shading. This representation permits flexible image manipulation and processing.

Accordingly, a number of aspects of the invention are presented, along with a number of exemplary embodiments, which are not intended as limiting.

One such aspect is a method of determining absolute coordinates of a three-dimensional surface of an object. Such a method comprises projecting two phase-shifted illumination patterns, wherein each of the illumination patterns encodes a marker, onto the surface of the object; capturing images of reflections of the illumination patterns from the surface of the object; combining the captured images as to generate a phase-wrapped image; generating a relative unwrapped phase image by unwrapping the phase-wrapped image; generating an absolute phase image from the relative unwrapped phase image; and determining absolute coordinates of the surface of the object from the absolute phase image. The illumination patterns may be color encoded patterns, and capturing the images of the reflections of the patterns may comprise capturing said images in a black and white mode. The images of the reflections of the patterns also may be captured in a black and white mode and in a color mode. A uniform illumination pattern also may be projected, and a black and white texture of the surface of the object may be captured simultaneously with determining the absolute coordinates of the surface of the object, using an image of a reflection from the surface of the object of the uniform illumination pattern. The uniform illumination pattern may be color encoded. When a uniform illumination pattern is projected, a color texture of the surface of the object may be captured simultaneously with determining the absolute coordinates of the surface of the object, using an image of a reflection from the surface of the object of the uniform illumination pattern captured in the color mode. Capturing the black and white or color texture may include removing the encoded marker from the captured image of the uniform illumination pattern. Phase unwrapping may comprise: generating a quality map; dividing the quality map into multiple quality levels; and applying a phase unwrapping algorithm to each of the levels separately, in order of decreasing quality. Generating the quality map may comprise generating a gradient map of the phase-wrapped image or a variance map of the phase-wrapped image. The phase unwrapping algorithm may be a fast scan-line phase unwrapping algorithm.

In some embodiments, the two phase-shifted illumination patterns may be separated by approximately 90 degrees of phase shift. Generating two phase-shifted illumination patterns may comprise generating only two phase-shifted illumination patterns.

In some embodiments, generating the absolute phase image from the relative unwrapped phase image may include detecting a phase of the encoded marker and adjusting the relative unwrapped phase image according to the detected phase of the encoded marker.

According to another aspect, an apparatus is discussed for determining absolute coordinates of a three-dimensional surface of an object. Such apparatus may comprise: at least one illumination pattern generator for generating two phase-shifted illumination patterns, wherein each of the illumination patterns encodes a phase marker; at least one projection device for projecting the illumination patterns onto the surface of the object; at least one imaging device for capturing images of reflections of the illumination patterns from the surface of the object; and at least one image processor for processing the captured images to determine the absolute coordinates of the surface of the object as a function of a decoded phase of the marker. The at least one projection device may be synchronized with the at least one imaging device. The at least one illumination pattern generator and the at least one image processor may be part of an integral unit. The at least one image processor may be adapted and configured, when processing the captured images, to: combine the captured images as to generate a phase-wrapped image; generate a relative unwrapped phase image by unwrapping the phase-wrapped image; generate an absolute phase image from the relative unwrapped phase image; and determine absolute coordinates of the surface of the object from the absolute phase image.

In some embodiments, the at least one illumination pattern generator generates and the at least one projection device may project a uniform illumination pattern, and the at least one imaging device may capture an image of a reflection of the uniform illumination pattern from the surface of the object. The at least one imaging device may capture images in a black and white mode and at least one imaging device may capture images in a color mode. The at least one imaging device may capture images in a black and white mode and may capture images in a color mode operate independently and in synchronization.

In some embodiments, illumination patterns may be color encoded patterns, and the images of the reflections of the patterns may be captured in a black and white mode. The illumination patterns may be color encoded patterns, and the images of the reflections of the patterns may be captured in a black and white mode and in a color mode. A black and white texture of the surface of the object may be captured simultaneously with determining the absolute coordinates of the surface of the object, using the image of the reflection of the uniform illumination pattern. A color texture of the surface of the object may be captured simultaneously with determining the absolute coordinates of the surface of the object, using the image of the reflection of the uniform illumination pattern, and wherein the image was captured in the color mode. Capturing the black and white or color texture may include removing the encoded marker from the image of the uniform illumination pattern.

In some embodiments, the at least one image processor may be configured and arranged, when phase unwrapping, to: generate a quality map; divide the quality map into multiple quality levels; and apply a phase unwrapping algorithm to each of the levels separately, in order of decreasing quality of data points in the levels. The at least one image processor when generating a quality map may generate a gradient map of the phase-wrapped image. Generating a quality map also may comprise generating a variance map of the phase-wrapped image. The phase unwrapping algorithm may be a fast scan-line phase unwrapping algorithm.

In some embodiments wherein two phase-shifted illumination patterns are projected, they may be separated by approximately 90 degrees of phase. Generating two phase-shifted illumination patterns may in some embodiments comprise generating only two phase-shifted illumination patterns, with or without a uniform illumination pattern.

In some embodiments, generating the absolute phase image from the relative unwrapped phase image may include detecting a phase of the encoded marker and adjusting the relative unwrapped phase image according to the detected phase of the encoded marker.

In some embodiments, a graphics processing unit may be used to determine the absolute coordinates of the surface of the object from the absolute phase image. Determining the absolute phase image from the relative unwrapped phase image may include detecting a phase of the encoded marker and adjusting the relative unwrapped phase image according to the detected phase of the encoded marker.

According to another aspect, a method is provided of capturing an image of a 3D object which encodes the surface geometry of at least a portion of the object, comprising: projecting a plurality of fringe patterns onto the object; capturing phase alterations in reflections of the fringe patterns from the object; projecting a uniform image onto the object; capturing a reflection of the uniform image from the object; and combining captured phase alterations and captured uniform image reflection on a pixel-by-pixel basis, thereby forming a holoimage representation of the object. The combined phase alterations and uniform image reflections may be mapped to respective color field displays. In some embodiments, the combined phase alterations and uniform image reflections may be stored as values for three color signals. For example, said values may be stored as three 8-bit values per pixel.

In some embodiments, the method further comprises phase unwrapping the captured phase alterations, said phase unwrapping including: projecting a plurality of fringe patterns onto the object at a first, relatively low spatial frequency and reconstructing the geometry of the object from reflections therefrom; projecting a plurality of fringe patterns onto the object at a second, relatively higher spatial frequency and reconstructing the geometry of the object from reflections therefrom, said reconstruction including pixels of ambiguous phase; and removing said phase ambiguity in accordance with a phase value of a corresponding pixel in the reconstructed geometry from the first, relatively low spatial frequency.

Another aspect is a method of generating a representation of a virtual 3D object which encodes the surface geometry of at least a portion of the object, comprising: calculating phase shifts and amplitudes that would result between incident and reflected images were each of a plurality of fringe patterns and a uniform pattern, respectively, shone on a physical counterpart of the object; and combining said calculated phase shifts and amplitudes on a pixel-by-pixel basis, thereby forming a holoimage representation of the object.

In some embodiments, the combined phase shifts and amplitudes may be stored as values for three color signals. For example, as three 8-bit values per pixel.

In some embodiments, the method further comprises phase unwrapping the captured phase alterations, said phase unwrapping including: calculating phase shifts that would result between incident and reflected images were each of a plurality of fringe patterns shone on a physical counterpart of the object at a first, relatively low spatial frequency and reconstructing the geometry of the object from said phase shifts; calculating phase shifts that would result between incident and reflected images were each of a plurality of fringe patterns shone on a physical counterpart of the object at a second, relatively higher spatial frequency and reconstructing the geometry of the object from said phase shifts, said reconstruction including pixels of ambiguous phase; and removing said phase ambiguity in accordance with a phase value of a corresponding pixel in the reconstructed geometry from the first, relatively low spatial frequency.

According to a still further aspect, a recording of a representation of the surface geometry of a 3D object comprises a computer-readable medium having stored thereon, for each pixel a first value representing a captured or calculated phase change resulting from a first fringe pattern being projected onto and reflected from the object, a second value representing a captured or calculated phase change resulting from a second, phase-shifted fringe pattern being projected onto and reflected from the object, and a third value representing a captured or calculated amplitude resulting from a uniform fringe pattern being projected onto and reflected from the object.

It should be understood that the embodiments above-mentioned and discussed below are not, unless context indicates otherwise, intended to be mutually exclusive.

BRIEF DESCRIPTION OF THE DRAWINGS

A better understanding of the present invention can be gained when the following detailed description of embodiments of the invention is considered in conjunction with the following drawings, in which.

DETAILED DESCRIPTION

The invention and its advantages will be readily apparent to those skilled in the art from the following description of some prior art and embodiments of practicing the invention, which are given by way of example only, with reference to the accompanying drawings.

Prior Art Method and Apparatus for 3D Surface Contouring

Figure 1:
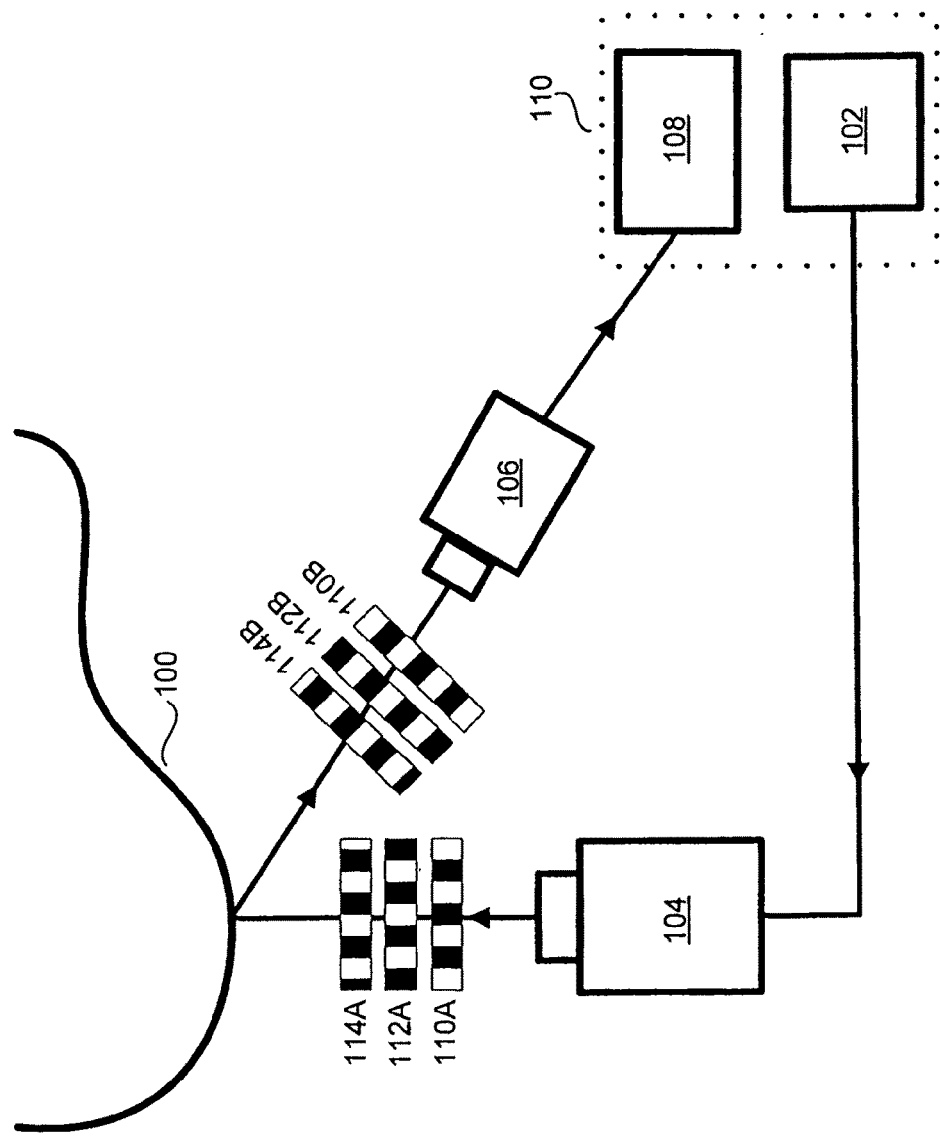
FIG. 1 is a schematic illustration of a setup for a prior art 3D contour measurement.

Referring to FIG. 1, a setup for a prior art system for 3D surface measurement is shown schematically. A signal generator 102 drives a projector 104 to illuminate a surface of an object 100. A camera 106 receives the corresponding reflected images and delivers them to an image processor 108. The image processor 108 derives the objects' surface contour from the reflected images.

As shown in FIG. 1, signal generator 102 and image processor 108 can be (and usually are) located within the same device 110, such as a personal computer, workstation, processor, or other device. For example, the signal generator and image processor may comprise separate software executing on a common single-core or multi-core processor. Signal generator 102 generates signals representing fringe patterns and sends those signals to projector 104. Projector 104 projects the patterns onto the surface of the object 100 as images 110A-114A, and camera 106 captures corresponding images 110B-114B reflected from the surface of the object 100. FIG. 1 demonstrates an example where images 110A-114A are projected sequentially and captured in a corresponding order. In those reflections, the surface geometry imparts phase distortions. That is, the projected patterns 110A-114A exhibit sinusoidal regularity in the intensity of fringes. FIG. 1 schematically shows vertical fringes. The fringes can also be horizontal, circular, or a combination of vertical, horizontal, and/or circular. The received patterns 110B-114B are no longer quite so regular; they contain regions of compression and regions of stretching. The transformations from the incident patterns to the received patterns uniquely correspond to the surface contour and the surface contour can be derived from them.

Operation of the projector and camera can and should be synchronized, using a previously published mechanism. Image processor 108 is used to process the images, an ultimate goal of the processing being to obtain absolute coordinates of the surface of the object, or the object's 3D geometry.

Figure 2:
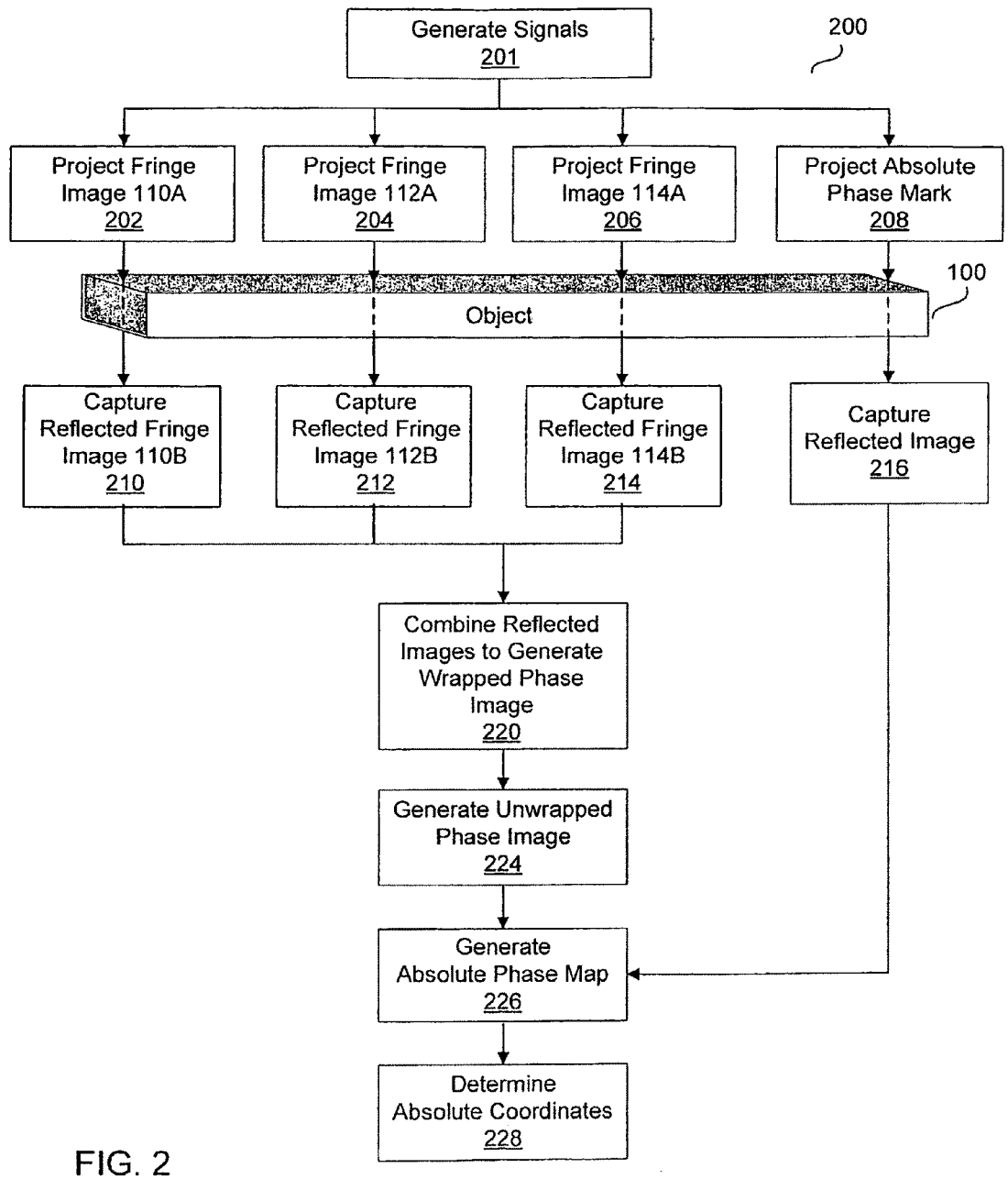
FIG. 2 is a flowchart of a prior art method for 3D contour measurement.

Referring now to FIG. 2, a prior art method for 3D surface contouring, 200, is based on generating (e.g., by the above-described signal generator 102) at least three fringe patterns 110A-114A, also called periodic illumination patterns, at 201, and projecting them at 202, 204, and 206. More than three fringe patterns have been used in practice as well, which however impedes the speed of further processing. The fringe patterns can be black and white (B/W) (e.g., if projected sequentially) or color coded (allowing them to be projected substantially simultaneously). Signal generator 102 also generates an absolute phase mark, which is projected at 208. The absolute phase mark is, according to the prior art, preferably a line. Each of the three fringe patterns 110A-114A is reflected from the surface of the object and a respective reflection is captured (at 210, 212 and 214) as a corresponding image (e.g., images 110B-114B). A separate image (not shown) of the absolute phase mark is obtained at 216.

Recovery of Depth and Other Characteristics from Phase

The capturing of phase distortions permits recovery of the target object's geometry—i.e., surface depth/contouring. Assume a geometric setup as follows: the image plane is the xy-plane, a reference plane is at z=0, the optical axis of the camera is the z-axis; the optical axis of the projector is on the xz-plane at an angle $\theta$ to the z-axis. The u axis of the projective texture is in the xz-plane; the v axis is parallel to the y axis, namely, the projected fringes are parallel to the y-axis. The fringe period on the reference plane along the x-axis then becomes $\lambda_x = \lambda/\cos\theta$. The surface is represented as a depth function z(x, y). The intensity at each pixel (x, y) on the fringe image is given by $$I(x, y) = a(x, y) + r(x, y)\cos(\psi(x, y) + 2\pi x/\lambda_x), \quad (1)$$

where a(x, y) is the ambient light intensity, and r(x, y) the reflectivity of the surface, which is very similar to the bidirectional reflection distribution function (BRDF) depending on the direction of lighting and the normal of the surface, the color, the material, and the texture of the surface. ψ is the phase and proportional to the depth z(x, y). The relative depth is recovered by $$z(x, y) = \frac{\psi_2(x, y) - \psi_1(x, y)}{2\pi \sin\theta} \lambda \qquad (2)$$

Eq. 2 has three unknowns: a(x, y), r(x, y) and ψ(x, y). Though it is not intuitive that one can deduce the ambient light, etc. from the captured (or generated) image, mathematically it is clear that the three unknowns can be found if there are three simultaneous equations available to solve them. The three equations can be generated by projecting three fringe textures with phase shift $$-\frac{2\pi}{3}, 0, \frac{2\pi}{3}.$$

Then, the intensity of the image is $$I_k(x, y) = a(x, y) + 0.5r(x, y)[1 + \cos(\psi(x, y) + 2(k-1)\pi/3)],$$

where k=0,1,2, and the phase ψ, reflectivity r, and the ambient light a can be solved as follows:

$$\phi(x, y) = \tan^{-1}\left(\sqrt{3}\frac{I_0 - I_2}{2I_1 - I_0 - I_2}\right), \qquad (3)$$

$$r(x, y) = 2\sqrt{(I_3 - I_2)^2 + (2I_1 - I_2 - I_3)^2}, \qquad (4)$$

$$a = (I_0 + I_1 + I_2)/3 - r/2, \qquad (5)$$

and a+r/2 is the reconstructed shading.

More generally, projecting the three illumination patterns implies that a so-called three-step phase-shifting is performed, which is followed by combining images 110B-114B into a single wrapped phase image at 220. The intensities of the three captured images separated from one another by a phase shift of δ are denoted for each pixel (x, y) as I₁(x, y), I₂(x, y), and I₃(x, y), respectively, and defined as follows:

$$I_1(x, y) = I'(x, y) + I''(x, y)\cos(\phi(x, y) - \delta), \qquad (6)$$

$$I_2(x, y) = I'(x, y) + I''(x, y)\cos(\phi(x, y)), \qquad (7)$$

$$I_3(x, y) = I'(x, y) + I''(x, y)\cos(\phi(x, y) + \delta), \qquad (8)$$

where I'(x, y) is the average intensity of the three intensities, I''(x, y) is the intensity modulation, and φ(x, y) is the phase to be determined. The phase shift δ may vary from one application to another, but experiments demonstrated that a phase shift of 120 degrees provides a relatively small measurement error, as described in the prior art.

Solving Eqs. (6)-(8), the phase is obtained as $$\phi(x, y) = \tan^{-1}\frac{(1 - \cos(\delta))(I_1(x, y) - I_3(x, y))}{(2I_2(x, y) - I_1(x, y) - I_3(x, y))\sin(\delta)}. \qquad (9)$$

A data modulation technique is used to represent a "quality" of the determined phase in each pixel (x, y), and the quality value is expressed as $$\gamma(x, y) = \frac{I''(x, y)}{I'(x, y)} \qquad (10)$$

$$= \frac{\sqrt{[(1 - \cos(\delta))(I_1(x, y) - I_3(x, y))]^2 + [\sin(\delta)(2I_2(x, y) - I_1(x, y) - I_3(x, y))]^2}}{(I_1(x, y) + I_3(x, y) - 2I_2(x, y))\sin(\delta)}$$

The quality value ranges from 0 to 1, with 1 being the best. The data modulation has been used, for example, to remove the background from the image.

The wrapped phase image is subsequently unwrapped via a conventional phase unwrapping, which produces a relative unwrapped phase image at 224. Subsequently, an absolute phase map is determined at 226, which is assisted by the captured reflected image of the absolute phase mark. The projector and camera shown in FIG. 1 and used in the method illustrated in FIG. 2 are calibrated by a method described in Zhang and Huang (Zhang, S., and Huang, P. S., "Novel Method for Structured Light System Calibration." Optical Engineering, 45, 2006), incorporated herein by reference. From the absolute phase map and taking advantage of the fact that, due to the calibration, for each pixel of the captured image, the corresponding pixel of the projected image is known, absolute coordinates of a surface of the object 100 are determined at 228.

Apparatus for 3D Surface Measurement

Figure 3:
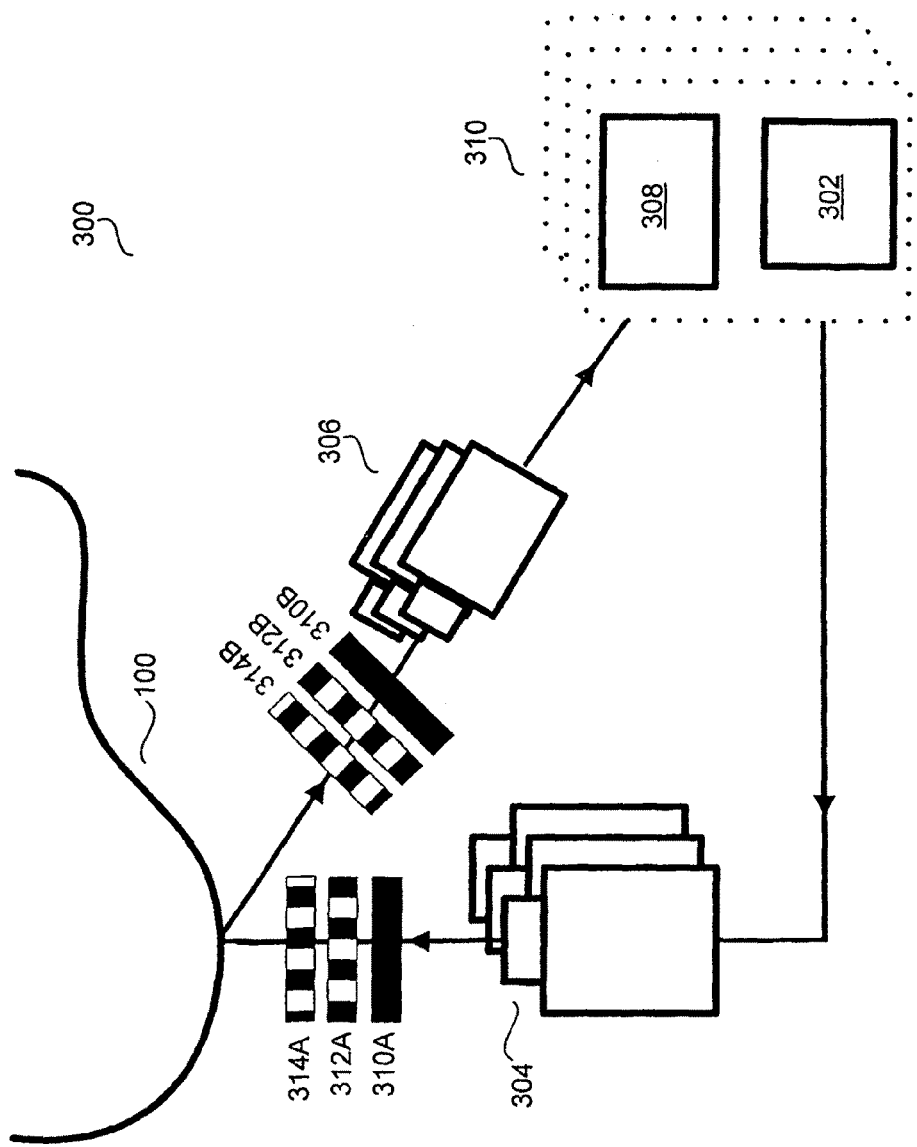
FIG. 3 is a schematic illustration of a setup for 3D surface measurement according to the present invention.

In contrast, FIG. 3 contains a general layout of apparatus that may be used in at least some embodiments for practicing the present invention. As shown, an apparatus 300 for 3D surface measurement includes at least one signal generator 302, at least one projector 304 that projects images 310A-314A onto object 100, at least one camera 306 that captures reflected images 310B-314B, and at least one image processor 308. Multiple projectors 304 are shown in FIG. 3 to suggest the possibility that in some embodiments, each of a plurality of projectors projects illumination patterns simultaneously, rather than a single projector projecting the patterns sequentially (which is also a possibility), depending on the required speed of an application and availability of sufficient resources to process the thus generated multiple images. Multiple cameras have been advantageously exploited, as will be discussed below.

Figure 4:
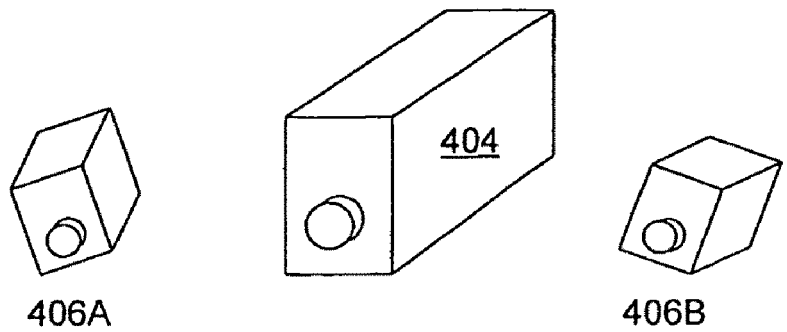
FIG. 4 is a schematic illustration of a setup for 3D surface measurement comprising two cameras and one projector.

Referring to FIG. 4, a partial embodiment of apparatus according to some aspects of the present invention is shown schematically, wherein two cameras 406A and 406B and one projector 404 are included. The two cameras 406A and 406B simultaneously and independently capture two respective images of an illuminated object which then can be combined into one. The cameras may provide black and white (B/W) or color imaging capability. Preferably, the cameras are B/W.

Figure 5:
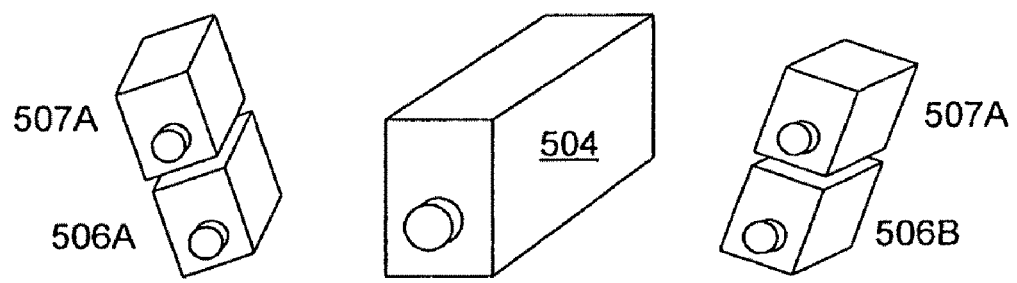
FIG. 5 schematically shows a setup for 3D surface measurement comprising two pairs of cameras and one projector.

Referring to FIG. 5, a general layout of another partial embodiment is depicted. This embodiment includes two B/W cameras 506A and 506B, each paired with a color camera 507A and 507B, respectively. One projector 504 is employed. FIG. 5 shows four cameras. Alternatively, a single B/W camera can be paired with a single color camera (not shown). Employing a color camera along with a B/W camera allows capturing color texture of the surface of the object, simultaneously with capturing the absolute coordinates of the surface. The two B/W camera/color camera pairs provide a wider-area coverage than one B/W camera/color camera pair. B/W cameras 506A and 506B are used to capture the 3D geometry data, and color cameras 507A and 507B provide capture of the color texture, which will be described below in conjunction with FIG. 9.

Figure 6:
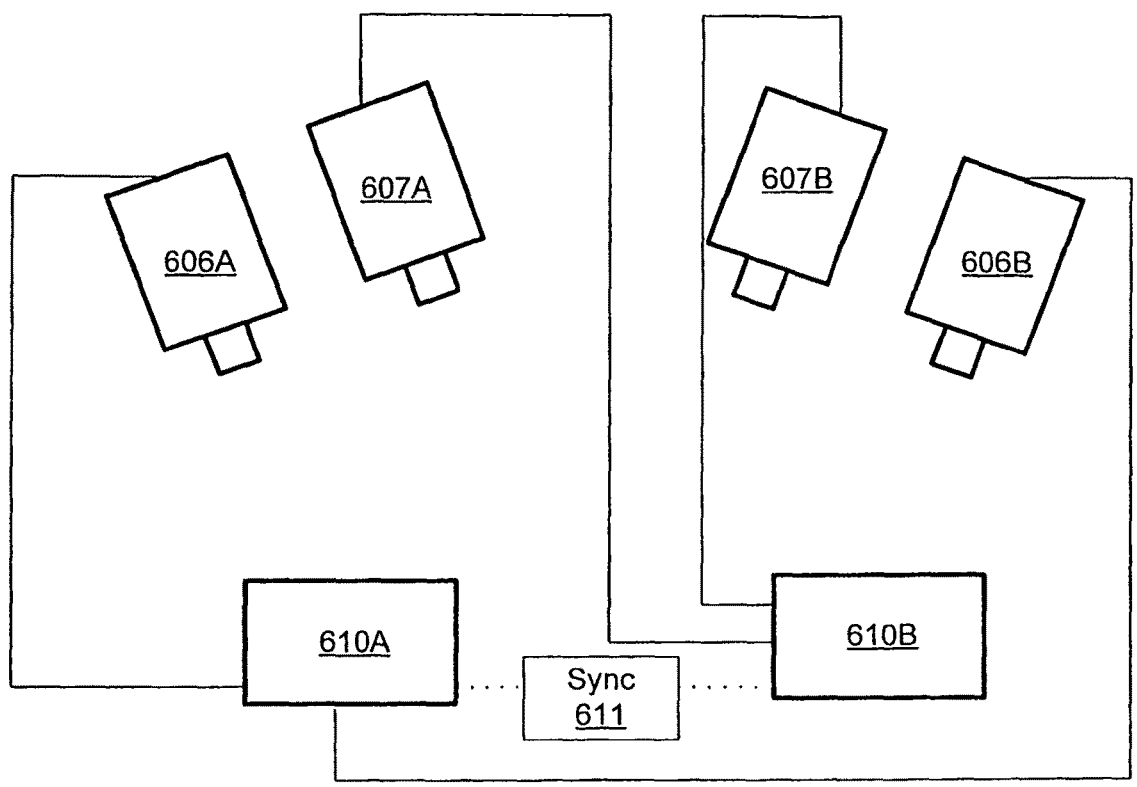
FIG. 6 schematically shows a setup for 3D surface measurement comprising two pairs of cameras and two projectors.

FIG. 6 illustrates yet another partial embodiment which comprises two workstations 610A and 610B, one associated with a pair of B/W cameras 606A and 606B and another associated with a pair of color 607A and 607B cameras. As was shown in FIGS. 1 and 3, a suitable workstation can house both a signal generator and an image processor, implemented on one or more processor cores. In a processor of each workstation, a program may be run to ensure that the two associated cameras work independently but in synchronization. The capture speed is preferably high and the resulting data volume may be large; therefore, each workstation preferably has at least two processors, each dedicated to handling one camera. To obtain the 3D geometry and color texture information on the surface of the object independently and simultaneously, both processors of the workstations 610A and 610B may be triggered by an external trigger source 611, so that the timing of image acquisition is determined by an external signal. Alternative setups comprising projector(s), camera(s) and other devices may be employed as well.

Overview of a Method for Absolute Coordinate 3D Surface Measurement

Figure 7:
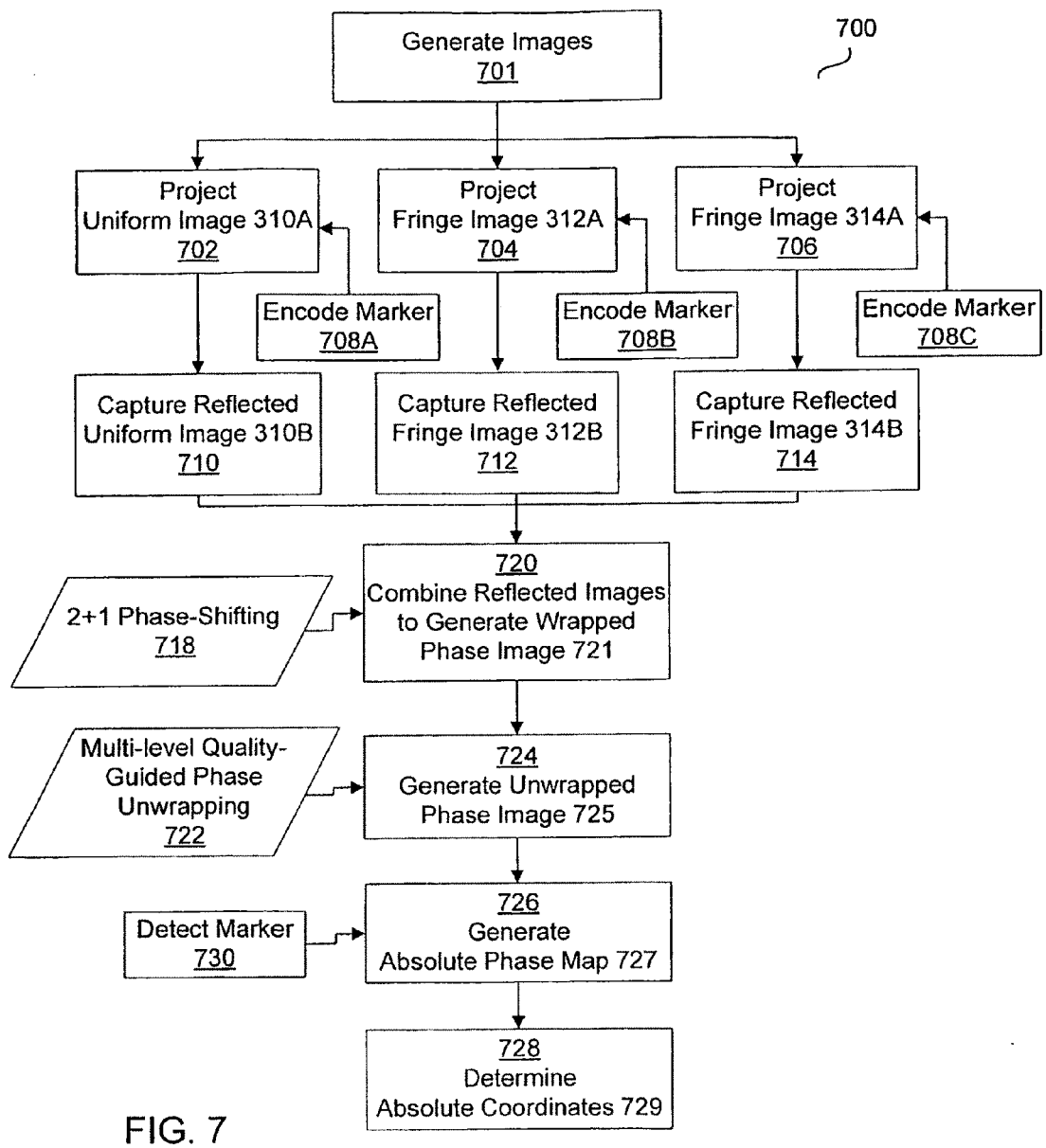
FIG. 7 is a flowchart of a method for absolute coordinate 3D surface measurement.

Referring to FIG. 7, a flowchart 700 of a method for absolute coordinate 3D surface measurement employed in embodiments of the present invention is provided. Instead of the three illumination patterns generated as part of the prior art 3D surface contouring method 200, two fringe illumination patterns, or images, 312A and 314A and one uniform illumination pattern, or image, 310A are generated by signal generator 302, at 701. It is advantageous to use two, as opposed to three, periodic illumination patterns, since this results in decreased processing needs and a corresponding increase in the measurement speed. The two fringe patterns are shifted 90 degrees relative to each other, which has an advantage over the 120 degree shift employed in the prior art, in that simpler, and therefore faster, calculations of the phase of each pixel of a resulting image ensue. Additionally, a small marker is encoded in each of the illumination patterns, as indicated at 708A-708C. In embodiments of the invention, the marker is a small cross formed by a 5-pixel long vertical line crossing a horizontal line, also 5-pixel long. The illumination patterns 310A-314A, bearing respective markers encoded at 708A-708C, are projected into the surface of the object 100 using projector 304, at 702, 704, and 706, respectively. The markers are encoded in the illumination patterns and projected along with the patterns; therefore, only three images are needed instead of the four shown in FIG. 2. This, as was already pointed out, increases the speed of the measurements. The reflections of the patterns from the surface of the object are captured by camera(s) 306. The three patterns 310A-314A are projected sequentially and repeatedly, and the operations of the projector and camera is synchronized. The captured fringe images 312B and 314B and a uniform image 310B are further processed within image processor 308. A first processing step involves combining the three captured images to generate a wrapped phase map.

Images 310B-314B are combined, at 720, to generate a wrapped phase image 721, which is referred to as a 2+1 phase-shifting algorithm. The "2+1" notation relates to using two fringe and one uniform images to illuminate the object. The intensities of images 312B, 314B, and 310B can be denoted as $I_1$, $I_2$, and $I_3$, respectively. It should be appreciated that the numbering order of the images is arbitrary. An advantage of using the 2+1 phase-shifting algorithm over the three-step phase-shifting applied in prior art (wherein three fringe images separated by 120 degrees are utilized) is that it enables capturing high-quality texture simultaneously with capturing the 3D geometry of the surface of the object. Moreover, using this algorithm may reduce computational errors associated with motion of the object.

The intensities of the three illumination patterns at each pixel (x, y) are expressed as follows:

$$I_1(x, y) = I'(x, y) + I''(x, y)\sin(\phi(x, y)), \quad (11)$$

$$I_2(x, y) = I'(x, y) + I''(x, y)\cos(\phi(x, y)), \quad (12)$$

$$I_3(x, y) = I'(x, y), \quad (13)$$

where I'(x, y) is the average intensity (of the intensities $I_1$(x, y) and $I_2$(x, y)), I"(x, y) is the intensity modulation, and $\phi$(x, y) is the phase to be determined.

Solving Eqs. (11)-(13), the phase is defined as $$\phi(x, y) = \tan^{-1} \frac{I_1(x, y) - I_3(x, y)}{I_2(x, y) - I_3(x, y)}, \quad (14)$$

where the resulting phase at each pixel (x, y) is modulo $2\pi$, with its values laying in the range of [0, $2\pi$]. A quality value for the phase at each pixel (x, y), which ranges from 0 to 1, is determined using the data modulation technique and is defined as $$\gamma(x, y) = \frac{I''(x, y)}{I'(x, y)} \quad (15)$$

$$= \frac{\sqrt{(I_1(x, y) - I_3(x, y))^2 + (I_2(x, y) - I_3(x, y))^2}}{I_3(x, y)}.$$

Typically, the quality of the phase data is used to remove the background from the image, using some threshold. Additionally, in embodiments of the invention, the quality value is employed in the detection of the encoded marker, as described below.

Referring again to FIG. 7, further processing of wrapped phase image 721 includes employing a multi-level quality guided phase unwrapping algorithm 722 to generate an unwrapped phase image 725 at 724. Markers encoded at 708A-708C are detected at 730 in order to help generate absolute phase map 727 at 726, which is followed by determination of absolute coordinates 729 at 728.

Figure 8:
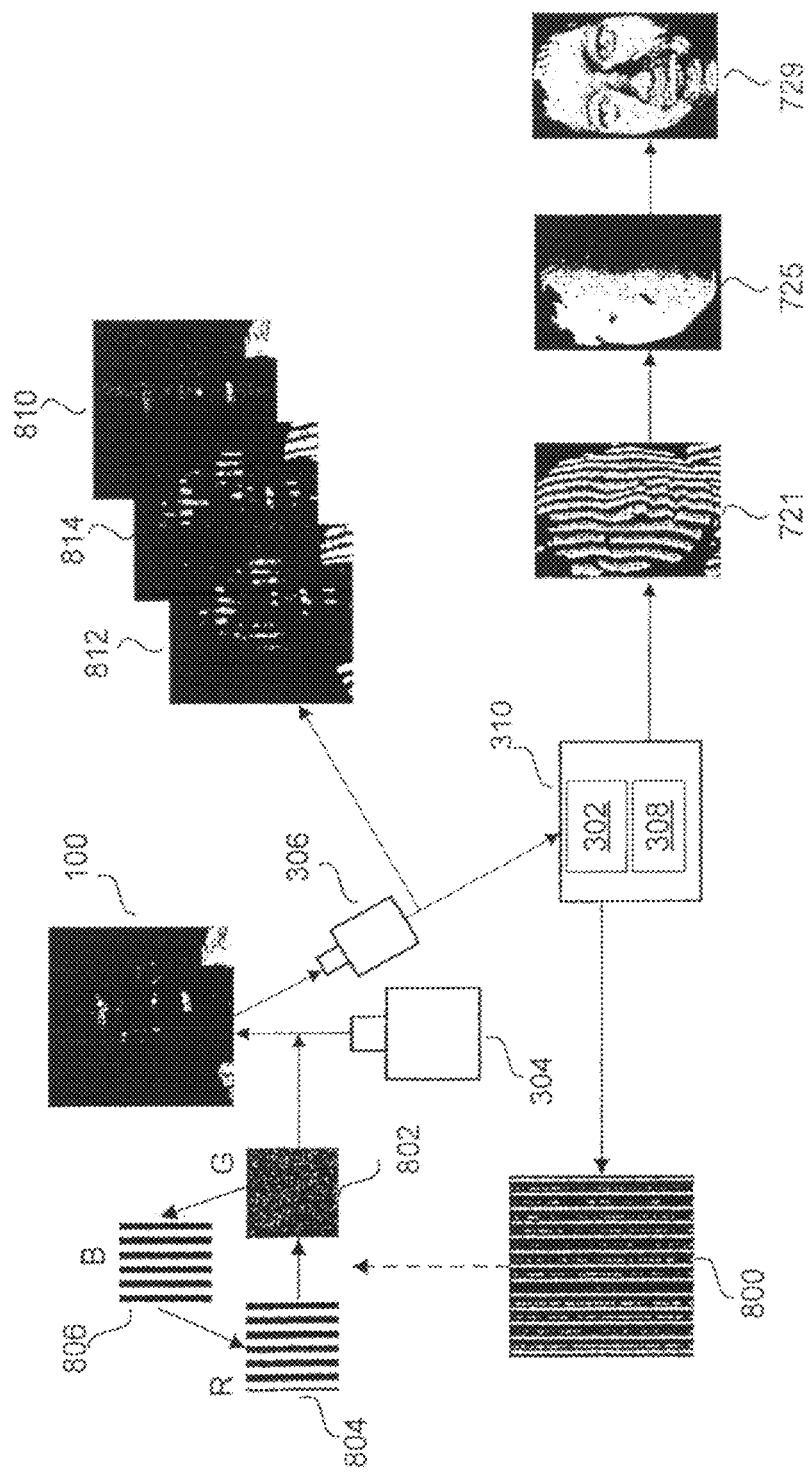
FIG. 8 is a layout for a method and apparatus for absolute coordinate 3D surface measurement, employing a 2+1 phase-shifting architecture.

FIG. 8 diagrammatically illustrates an aspect of some embodiments in which color encoded images are generated by signal generator 302 as a superimposed color encoded signal 800. Signal 800 is then sent to projector 304. Projector 304 may be, for example, a single-chip digital light processing (DLP) projector, which projects superimposed signal 800 as three separate patterns, based on a digital light switching technique. In DLP projectors, the image is created by microscopically small reflective mirrors arranged in a matrix on a semiconductor chip, known as a Digital Micromirror Device (DMD). In essence, every pixel on a DMD chip is a reflective mirror, The superimposed signal is a combination of three patterns 802, 804 and 806, encoded in green (G), red (R) and blue (B) channels, respectively. The assignment of color channels is somewhat arbitrary. Thus, the flat projection 802 does not have to be encoded in the G channel, but can also be encoded in one of the R or B channels. The DLP projector projects the superimposed signal, containing the illumination patterns, sequentially and repeatedly at a high speed. The reflections of the color-encoded patterns from the object 100 are captured in a B/W mode by camera 306. It should be appreciated that capturing the reflections in a color mode by a color camera is also possible. Also, the color encoding of the illumination patterns is optional.

The B/W mode is preferably utilized to avoid color coupling associated with using a color camera, as described in the prior art. Moreover, a color of the object may potentially be difficult to distinguish from the colors of the illumination patterns, which can interfere with a quality of measurement. Camera 306 may be a high-speed B/W camera, such as a charge-coupled device CCD camera, which is synchronized with projector 304 and used to capture the three patterns. A suitable camera would be Pulnix TM-6740CL (JAI PULNiX, Inc., San Jose, Calif.), though other suitable cameras may be used. The synchronization is described below with reference to FIG. 10.

In the implementation of embodiments of the present invention according to FIG. 8, R projection 804 and B projection 806 are fringe images, while G projection 802 is a flat image (i.e., possesses constant intensity). As can be seen in FIG. 8, resulting images of the surface of the object, 812 and 814, corresponding to projections 804 and 806, contain fringes, while the image 810, corresponding to projection 802, does not. Image 721 is an example of an image of object 100 after phase wrapping, which in the next step is unwrapped into image 725. The unwrapped image is then used to determine absolute coordinates of the surface of the object and the corresponding image of the 3D geometry is shown as image 729. The processing is performed by image processor 308 housed within the same platform 310 as signal generator 302.

Texture Capturing

In some applications, for example, in film-making, it is desirable to obtain a texture of the measured surface. In embodiments of this invention, the texture is defined as an actual image of the object that provides additional details on the surface of the object beyond the large scale 3D geometry of the object. The texture can also be a texture in the usual surface appearance and feel sense, such as cotton canvas, raffia, wood, sand, gravel, etc. However, for purposes of facial recognition, image generation and related computer graphics applications, the texture is used to create an appearance of complexity on the surface by mapping relatively fine details of the surface obtained from a (usually) 2D image into a related 3D space.

Capturing a flat, uniformly illuminated image provides such texture of the surface simultaneously with capturing the 3D geometry of the surface and in registration therewith. Often, obtaining a B/W texture (i.e., shading) is sufficient. Hence, a B/W camera may be used. Some applications, such as, for example, in the movie and video game industries, benefit from the availability of color texture of the objects whose 3D geometry is being ascertained. Accordingly, a color camera may be utilized in addition to a B/W camera.

Figure 9:
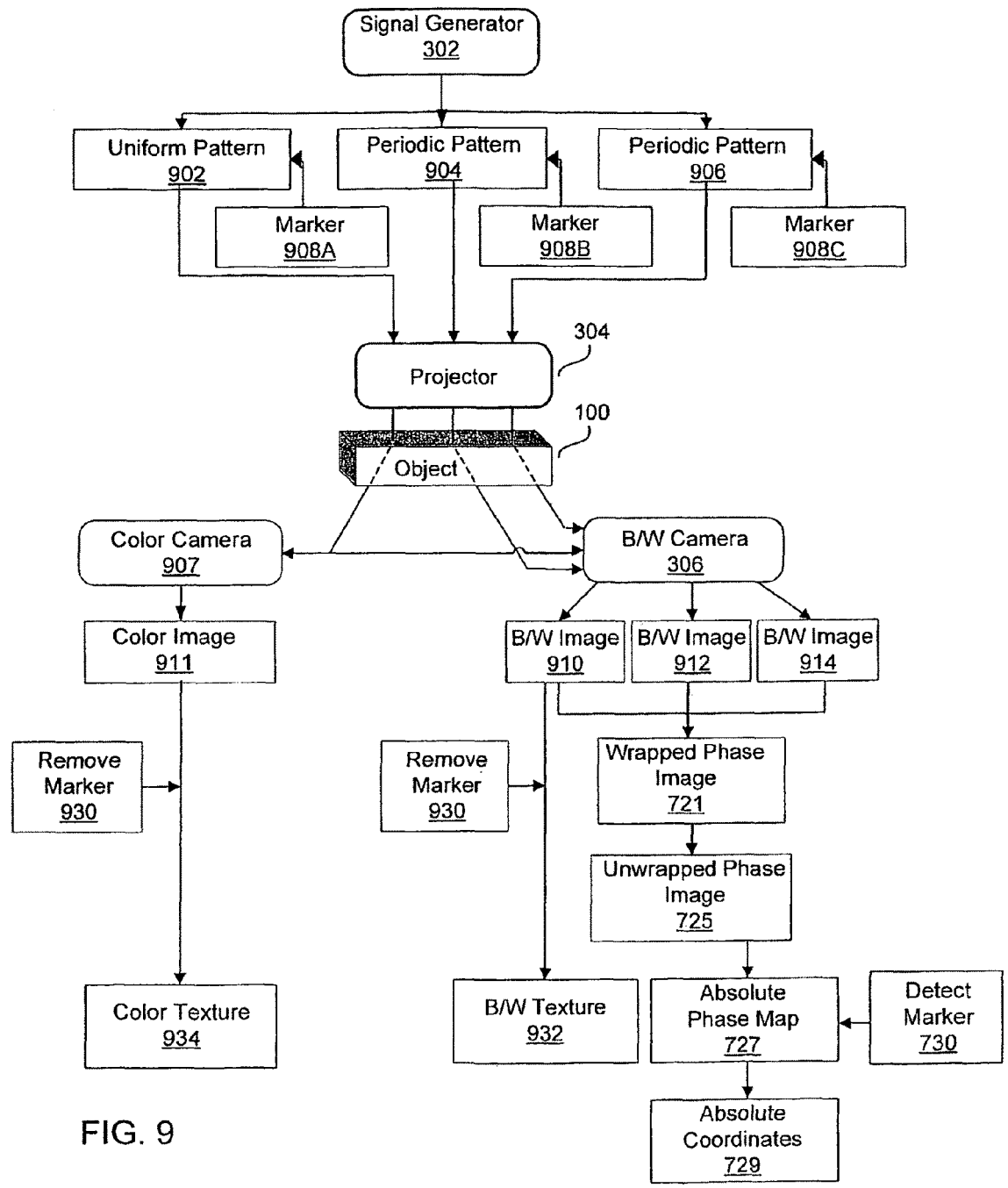
FIG. 9 is a flowchart of a method for absolute coordinate 3D surface measurement, wherein color and B/W textures are captured simultaneously with 3D geometry data.

FIG. 9 exemplifies embodiments of the present invention, which provide capturing of an additional image of a projected uniform pattern 902 by color camera 907, for obtaining color texture 934. Both B/W camera 306 and color camera 907 capture reflections 910-914 and 911, respectively, of the illumination patterns 902-906 generated by signal generator 302. Consequently, both B/W texture 932 and color texture 934 can be acquired. An image of the uniform pattern 902 is obviously taken in the B/W mode as well, and this allows acquiring B/W texture 932. While obtaining textures 932 and 934, encoded marker 908A is removed from the uniform image in step 930. The textures are mapped point-by-point into the absolute coordinates 727 and thus become part of the total surface data. Projector 304 and cameras 306 and 907 are calibrated (using a prior art method, described in more detail below), so that an exact position of each corresponding pixel of the projected image and captured image is known. Wrapped phase image 721 is generated according to the 2+1 phase shifting method described with conjunction to FIG. 7. Subsequently, unwrapped phase image 725 is generated, as will be described below. This is followed by generating absolute phase map 727, which is assisted by detecting the encoded marker (and determining its phase value) at 730. Finally, absolute coordinates 729 are determined, which is also discussed below.

Synchronization of the Projector and Cameras

Figure 10:
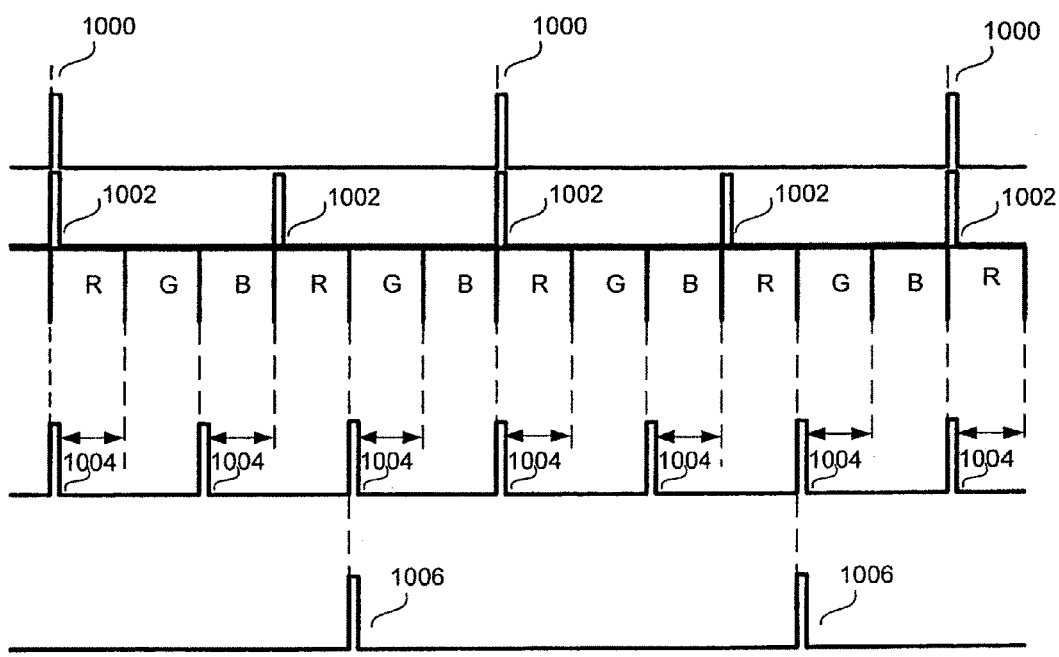
FIG. 10 is a timing chart showing synchronization between the projector and cameras.

Referring now to FIG. 10, a timing chart of an exemplary synchronization of the projector and cameras of FIG. 9 is shown. A projector, which in presently preferred embodiments of the invention is a single-chip DLP projector (e.g., PLUS U5-632h, PLUS Vision Corp.), receives the color coded images from the signal generator 302, as shown in FIG. 8, and projects them in a B/W mode sequentially and repeatedly at a frame rate of 120 fps. A high-speed CCD camera (e.g., Pulnix TM-6740CL, JAI PULNiX, Inc., San Jose, Calif.) synchronized with the projector is used to capture the reflected patterns at a speed of 180 fps. Based on the 2+1 phase-shifting algorithm, any three successive images can be used to reconstruct the 3D geometry. In a typical embodiment, the output from the signal generator to the projector may be supplied by a conventional computer graphics adapter, such as a Video Graphics Array (VGA) adapter card (not shown). Of course, any suitable graphics adapter or other graphics signal source may be substituted. The projector's internal timing 1002 may be synchronized with the vertical synchronizing signal (VSync) 1000 of the VGA. Although a 2:1 relationship is illustrated, this is not required. The VSync signal may be used as a trigger signal to a microcontroller-based circuit (not shown), which further generates trigger signal 1004 to the B/W camera and signal 1006 to the color camera. Since the projector and the cameras are triggered by the same timing source, VSync 1000, the synchronization between them is guaranteed. Any other approach that maintains synchronization may be substituted.

FIG. 10 shows that, due to the speed limitation of the B/W camera used (maximum speed is 200 fps), two projection cycles are required for the B/W camera to capture the three patterns coded in the R, B, and G projections, respectively (additionally emphasized with dashed vertical lines and horizontal arrows), which results in a frame rate of 60 Hz for the 3D surface measurement. A higher speed B/W camera may be used, in which case a higher frame rate can be achieved. The color camera captures color texture of the surface of the object at a frame rate of 60 fps. The exposure time for the color camera is related to one projection channel (G) carrying the flat image.

Phase Unwrapping

Figure 11:
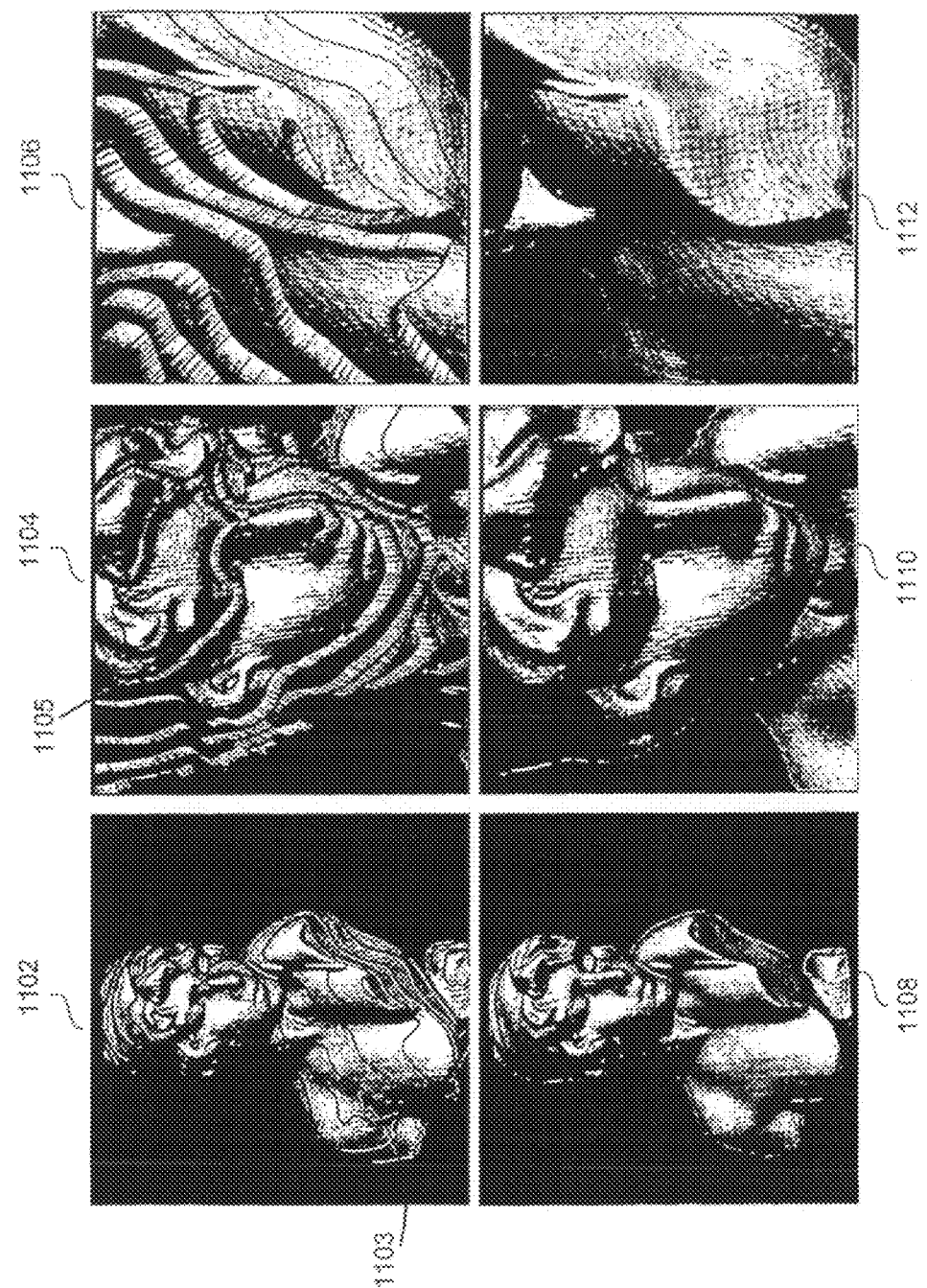
FIG. 11 demonstrates a difference between phase wrapped and unwrapped image.

Unfortunately, the recovered phase determined using Eq. 14 is not precise: it possesses a potential for inherent phase ambiguity by an amount $2k\pi$, where k is an integer, along apparent discontinuities. That is, the phase is said to "wrap" on itself at apparent discontinuities. Phase ambiguity will introduce depth jumps on the reconstructed image geometry. FIG. 11, shows a progressions of images 1102-1112 useful in explaining the reconstruction of an object image. Image 1102 shows a number of lines (e.g., line 1103) representing the loci or contours of phase discontinuities. The actual false phase indications are shown in image 1104 by the jumps (e.g., 1105) along lines 1103. Magnification is provided at image 1106. However, if it is assumed that the image does not have sharp discontinuities and that it has a smooth surface, the ambiguities can be removed using a so-called phase unwrapping algorithm. Phase unwrapping removes the $2k\pi$ discontinuities by adding or subtracting multiples of $2\pi$ radians at the discontinuities and yields the geometry shown at image 1108 (and magnified at images 1110 and 1112).

Thus, if the surface is smooth, then the phase jumping curves (the contours 1103) can be easily located and removed. In general, there are two approaches to removing the phase ambiguity: (1) comparing the phase values with those of neighboring pixels and effecting a smooth transition by replacement of the values along phase-wrapping contours and (2) forcing the values at such loci to conform to values obtained in another manner (e.g., the two-wavelength method discussed below).

To obtain a continuous phase map, a phase unwrapping algorithm of the first type is discussed with reference to FIGS. 12-14.

Figure 12:
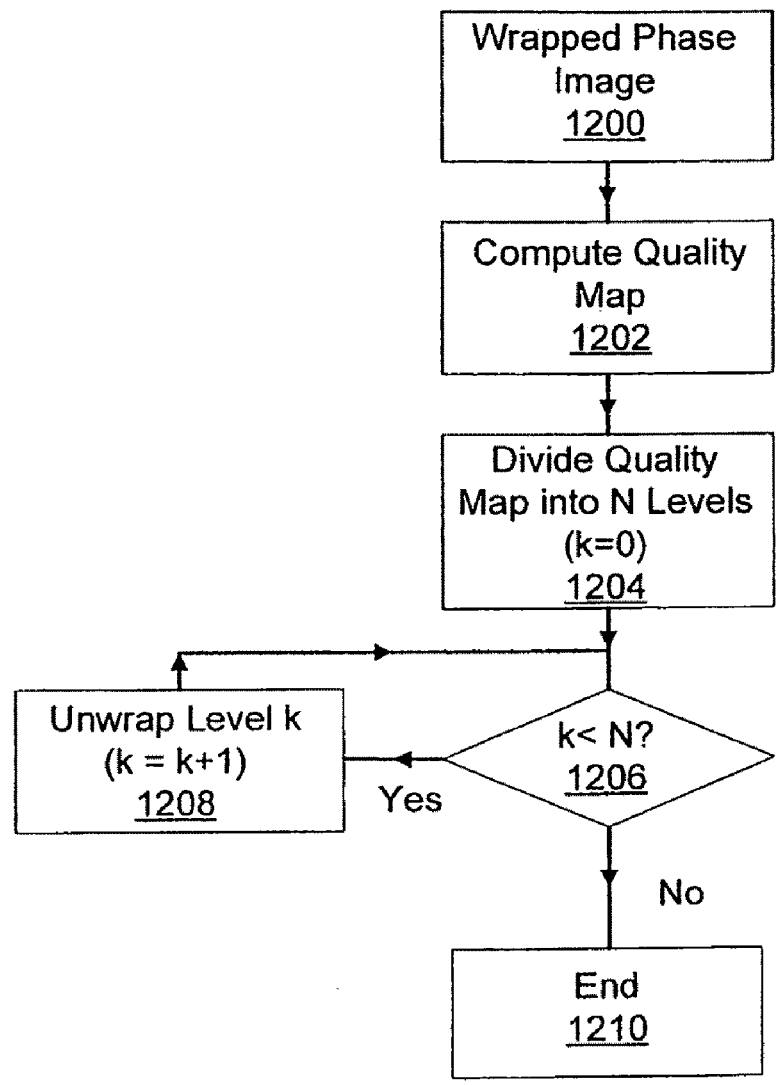
FIG. 12 is a flowchart of a multi-level quality-guided phase unwrapping algorithm.

Referring to FIG. 12, a wrapped phase image, or map, 1200 is processed to compute a quality map in step 1202. The quality map is divided into N quality levels in step 1204. The phase unwrapping process starts from a level, k, comprising the highest quality data points (i.e., k=0). If there are levels to process (step 1206), the unwrapping proceeds to a level containing next lower quality data points than in the previously processed level (step 1208), until all levels are processed (step 1210). For each level, the quality of the data points is considered equal and a fast scan-line phase unwrapping algorithm, shown in FIGS. 13 and 14, is employed.

Generating a quality map as part of phase unwrapping algorithm, to guide the phase unwrapping path, is known in the art. The quality map is usually constructed based on the first or second difference between a pixel and its neighboring pixels. A number of quality-guided phase unwrapping algorithms have been published. However, such quality-guided algorithms typically involve a time-consuming point-by-point sorting, which makes it difficult to achieve real-time performance at reasonable cost. Other algorithms exist that are able to perform phase unwrapping rapidly, but they do not provide sufficient accuracy. A quality-guided phase unwrapping algorithm discussed here is both fast and robust. Such a multi-level quality-guided algorithm can perform phase unwrapping fast enough to satisfy the speed requirements of the real-time 3D geometry acquisition, using only inexpensive processors such as those found in personal computers and graphics accelerators.

Figure 13:
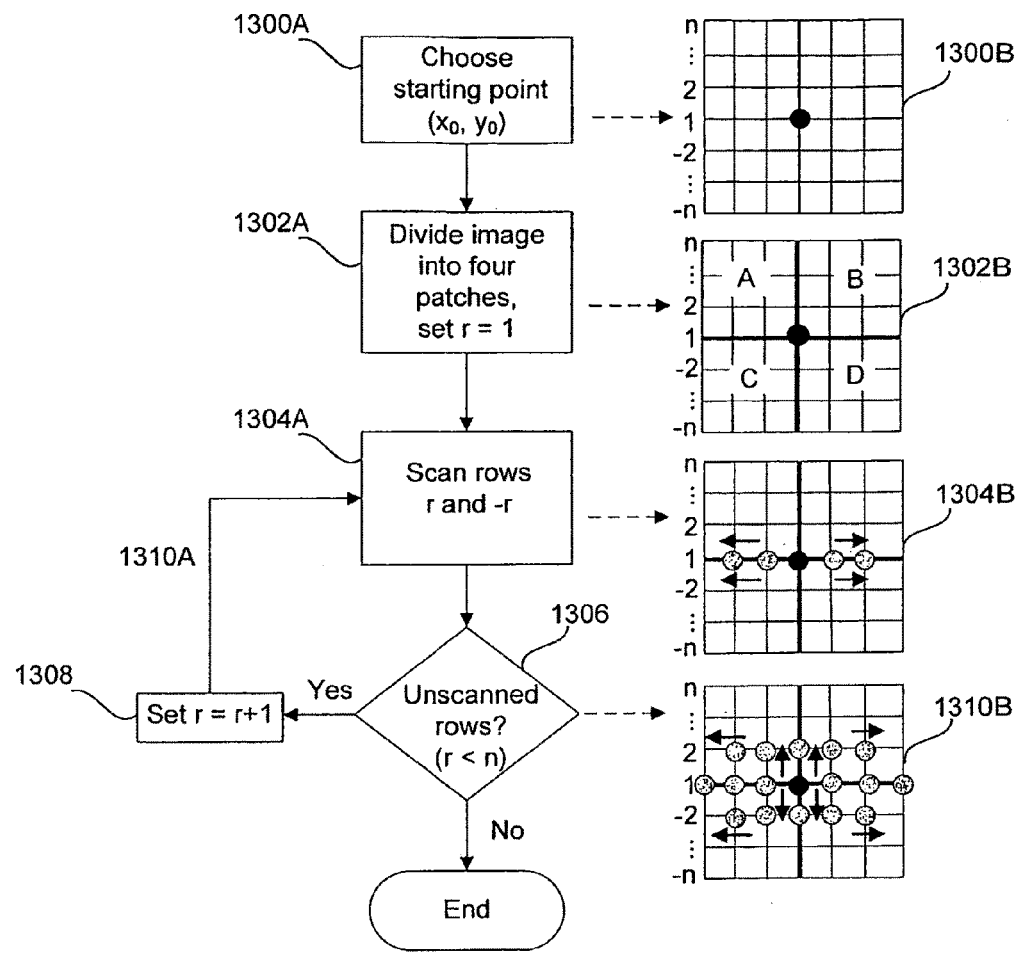
FIG. 13 is a diagram of a scan-line phase unwrapping algorithm.

Referring now to FIG. 13, a scan-line phase unwrapping algorithm, combined with the quality-guided algorithm, is schematically illustrated. The algorithm starts from choosing a start point $(x_0, y_0)$ at 1300A, typically in the center of the image, as shown in 1300B. The image, having n rows, is divided at 1302A into four patches A-D by horizontal and vertical (imaginary) lines going through the start point, as shown in 1302B, after which each patch is unwrapped by a scan-line method as follows. A horizontal scan-line guides scanning in both directions (i.e., leftward and rightward) from the start point to the left and right borders of the image, respectively, as depicted at 1304A-B. At step 1306, it is determined whether there are unwrapped rows in the image, and if there are, the horizontal scan-line advances vertically from the start point (1308) toward the top and bottom of the image to guide scanning the next two rows, as shown in 1310A-B.

Figure 14:
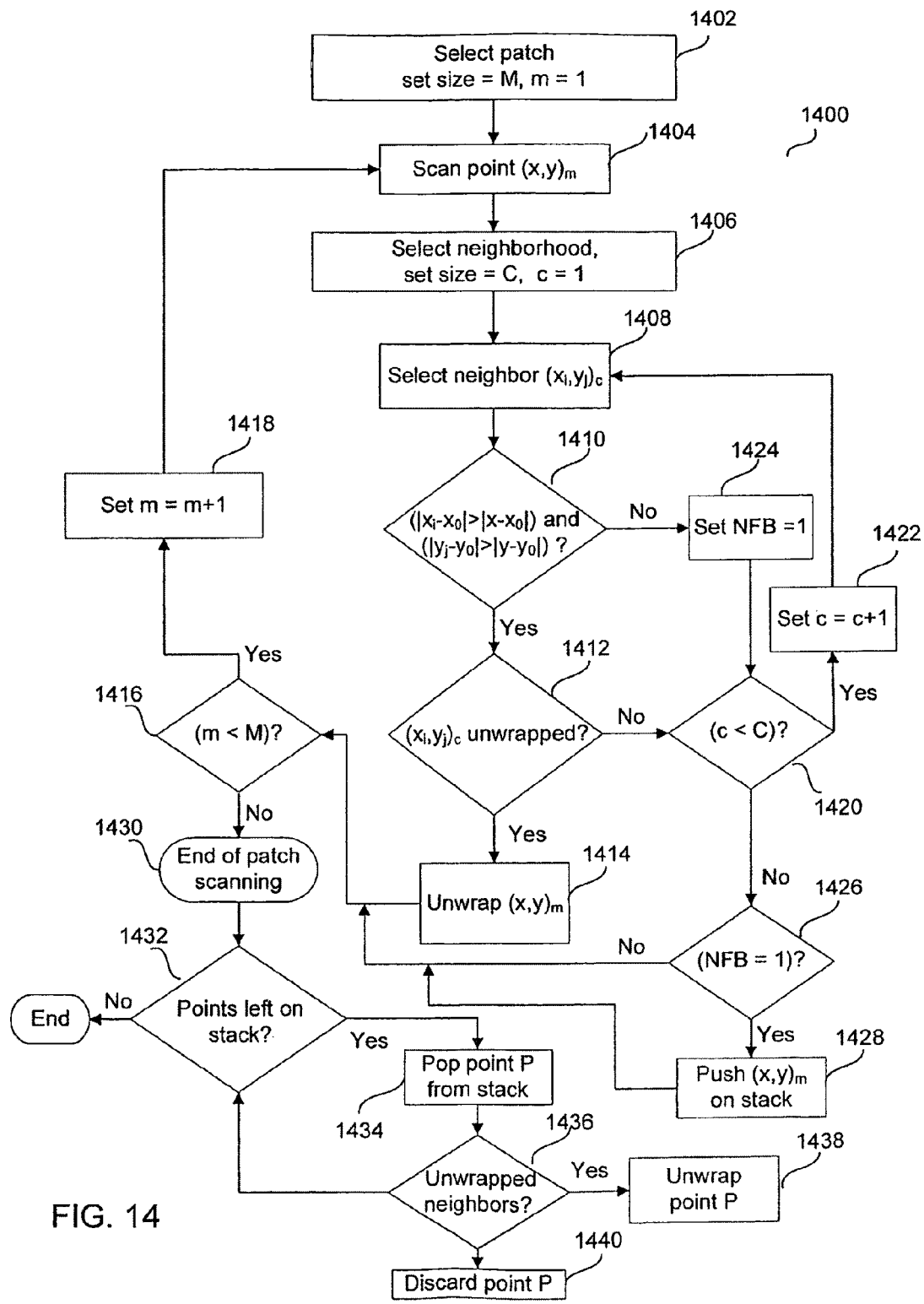
FIG. 14 is a flowchart of scanning a patch from an image as part of a scan-line phase unwrapping algorithm.

FIG. 14 demonstrates scanning 1400 of a patch. At first, let M be the size of the patch (i.e., a number of points in this patch) and a counter m be set to 1, at 1402. Scanning of a point $(x, y)_m$, shown in FIG. 14 with a subscript "m" for clarity, begins at 1404. (To avoid complicated notation, the subscript "m" is dropped from further discussion of $(x, y)_m$ herein.) A neighborhood of size L of the point $(x, y)$ is selected at 1406. Also, at 1406, a counter c, keeping track of processing of points within the neighborhood, is set to 1. The points within the neighborhood of the point $(x, y)$, each denoted as $(x_i, y_j)_c$ (the subscript "c" is not shown when mentioning $(x_i, y_j)_c$ hereinbelow or at 1410 in FIG. 14, to avoid complicated notation), can be divided into two groups: neighbors that face the start point $(x_0, y_0)$, particularly, the neighbors which have smaller x or y distance to the start point than the scanned point $(|x_i-x_0|<=|x-x_0|$ and $|y_j-y_0|<=|y-y_0|)$, and neighbors that face the border, which are the neighbors having larger x or y distance to the start point than the scanned point $(|x_i-x_0|>|x-x_0|$ or $|y_j-y_0|>|y-y_0|)$.

Accordingly, at 1410, for each neighbor $(x_i, y_j)$, it is determined whether this neighbor faces the start point. If the answer is affirmative, and if the neighbor is unwrapped, which is determined at 1412, the point $(x, y)$ is unwrapped, as shown at 1414. Therefore, if at least one of the neighbors of the scanned point, facing the start point, is unwrapped, the scanned point will be unwrapped and recorded as unwrapped. If the patch still has points to be scanned, an answer "yes" is produced at 1416, and scanning proceeds, through 1418, to the next point. It should be understood that only points that are "valid", i.e. do not belong to the background, need to be unwrapped. A negative answer produced in step 1410 indicates that the neighbor faces the border, and an indicator variable NFB is set to 1, at 1424. If the point $(x, y)$ has other neighbors, which is ascertained at 1420, the counter c is incremented at 1422 and another neighbor is examined. If all of the neighbors of the point $(x, y)$ have been examined and no unwrapped neighbors facing the start point have been found, it is determined, at 1426, whether the variable NFB has been previously set to 1 (i.e., the point $(x, y)$ has at least one valid neighbor facing the border). Is the answer is "yes", the point $(x, y)$ is "pushed" on a stack at 1428 and scanning proceeds further.

After all points in the patch are scanned (i.e., step 1430 is reached), the points in the stack, if there are any, which is determined at 1432, will be "popped" (i.e., processed) one by one. A popped point with at least one unwrapped neighbor facing the border, which is ascertained at 1436, will be unwrapped at 1438, while other popped points will be discarded without further processing, at 1440. Thus, the point $(x, y)$ is only scanned once and has two chances to be unwrapped.

Generation of the quality map deserves particular attention and therefore will now be described. A maximum phase gradient quality map is defined at each pixel as follows:

$$Q(i,j) = \max\{\Delta_{ij}^x, \Delta_{ij}^y\}, \tag{16}$$

where $Q(i,j)$ ranges from 0 to 1, x and y are horizontal and vertical directions, respectively, and the maxima are evaluated in a 3×3 neighborhood of a given pixel with coordinates $(i,j)$. The terms $\Delta_{ij}^x$ and $\Delta_{ij}^y$ are the maximum values of the partial derivatives of the phase in the x and y directions, respectively, and are defined respectively as follows:

$$\Delta_{ij}^x = \max\{|W\{\psi(i,j)-\psi(i,j-1)\}|, |\psi(i,j+1)-\psi(i,j)|\} \tag{17}$$

and $$\Delta_{ij}^y = \max\{|W\{\psi(i,j)-\psi(i-1,j)\}|, |\psi(i+1,j)-\psi(i,j)|\}, \tag{18}$$

where $\psi=\phi/2\pi$ is the normalized wrapped phase $\phi$ defined in Eq. (14), whose values range from 0 to 1. W is an operator that estimates the true gradient by wrapping the differences of the wrapped phase. It should be noted that the larger the value a pixel $Q(i,j)$ of the quality map contains, the worse the data quality. Therefore, the map is, in fact, a reverse quality map.

Each pixel $Q(i,j)$ of the quality map Q of dimension M×N is defined in Eq. (16). After applying data modulation masking, the quality map Q is assumed to be a normal distribution. The mean value and the standard deviation of the normal distribution are defined as $$\overline{Q} = \sum_{i=1}^{N}\sum_{j=1}^{M} Q(i,j)/MN, \quad (19)$$

and $$\sigma = \sum_{i=1}^{N}\sum_{j=1}^{M} \sqrt{(Q(i,j)-\overline{Q})}\Big/MN, \quad (20)$$

respectively.

To quantize the quality map into multiple levels, a threshold is chosen to first divide the data into two sets, one with the higher priority to be processed first and another to be processed later. The starting quality value threshold $th_s$ was chosen to be the mean $\overline{Q}$ of normal distribution Q. Therefore, data point set $\{(i,j)|Q(i,j)<th_s\}$ processed in the first round forms the first level, or level 1. For the n–$th_s$ level, the threshold value s is defined as $s=th_s+2^{(n-1)}Y$. The last level to be unwrapped comprises the data points not included in any of the higher-quality levels.

Employing the phase shifting algorithm of the present invention, followed by masking the background of the image using data modulation, typically results in more than 80% of the data points being in level 1. Use of the indicated digital pattern projections facilitates acquiring data of good quality. The multi-level quality guided algorithm was evaluated by the inventors, and the results showed that using three quality levels could provide unwrapped phase of sufficient quality for most needs. Larger numbers of levels can be used as well, but the greater the number of levels used, the slower the processing speed. At the other extreme case, a conventional quality-guided phase unwrapping algorithm may be substituted for the multi-level quality guided algorithm, if the sacrifice is acceptable.

Figure 15:
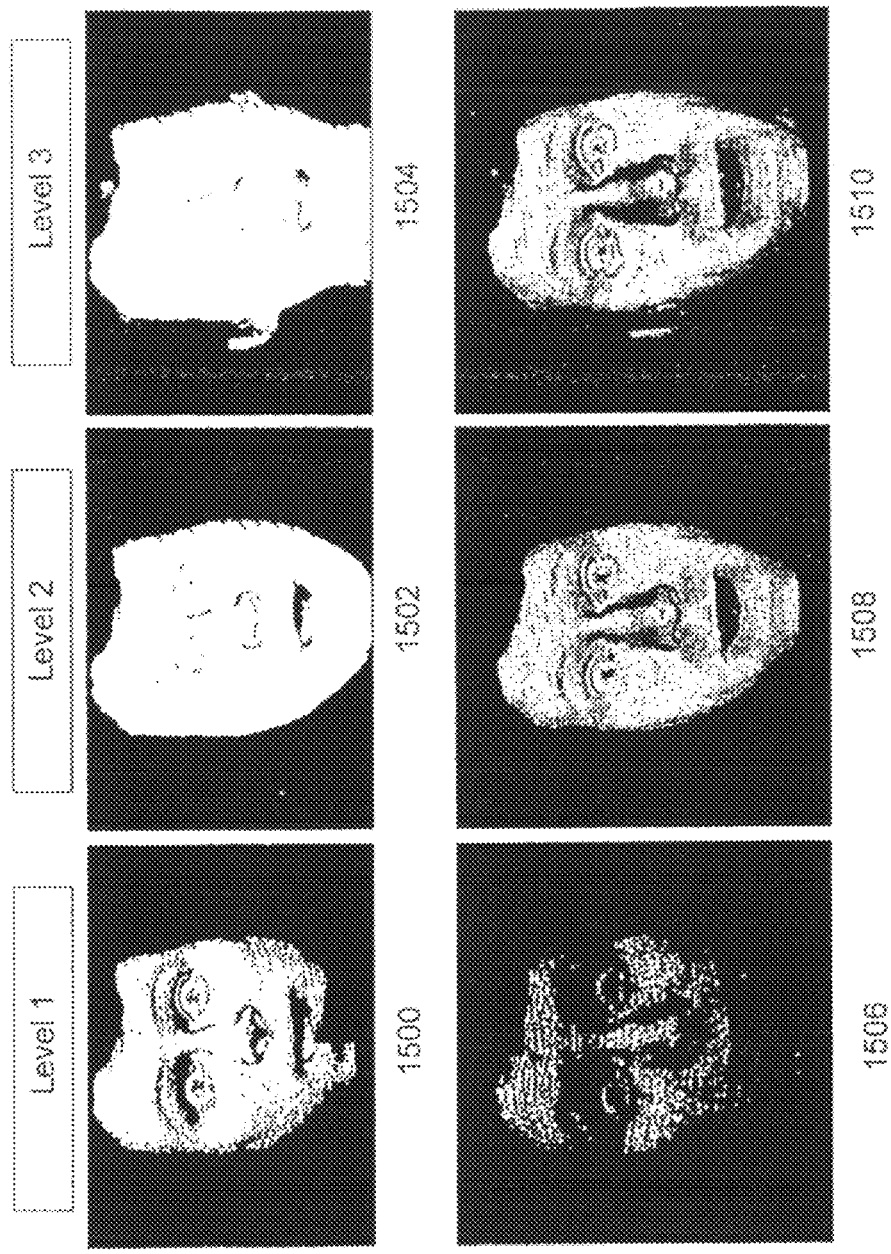
FIG. 15 is a set of images demonstrating a three-level quality-guided phase unwrapping algorithm.

FIG. 15 shows an example of applying a three-level quality-guided phase unwrapping algorithm to a wrapped image of a human face. The top row shows the unwrapped data sets 1500, 1502 and 1504 after each of the three unwrapping levels and the bottom row shows the corresponding images 1506, 1508 and 1510. It can be seen that the main features of the face are unwrapped already in level 1. In level 2, the image areas corresponding to some of the missed features, for example, the right part of the chin, are unwrapped. The remaining details, such as the left ear and part of the neck, are obtained in the last, third, level.

The process of smoothing out phase transitions at discontinuities by comparison with neighbor pixels is somewhat inefficient. Therefore, another approach was sought, resulting in a two-wavelength method. (More than two wavelengths can be used, of course, but two appear adequate. Thus, generically, one should consider this a multi-wavelength approach.) Basically, there are selected two spatial periods $\lambda_1$, $\lambda_2$ of projective textures, such that $\lambda_1$ is big enough to cover the whole range of the scene by one period. Therefore, there is no phase ambiguity, but the reconstructed geometric accuracy is low; $\lambda_2$ is much smaller, and there is phase ambiguity, but the geometric accuracy is much higher. By forcing there to be depth consistency between the two holoimages, the phase of the second one can be unwrapped—i.e., the necessary multiple of $2\pi$ can be determined. In other words, the depths do not have to be forced to be equal, but the depth from the first projection is used to establish into which multiple of $2\pi$ the phase of the second image should be mapped.

Figure 16:
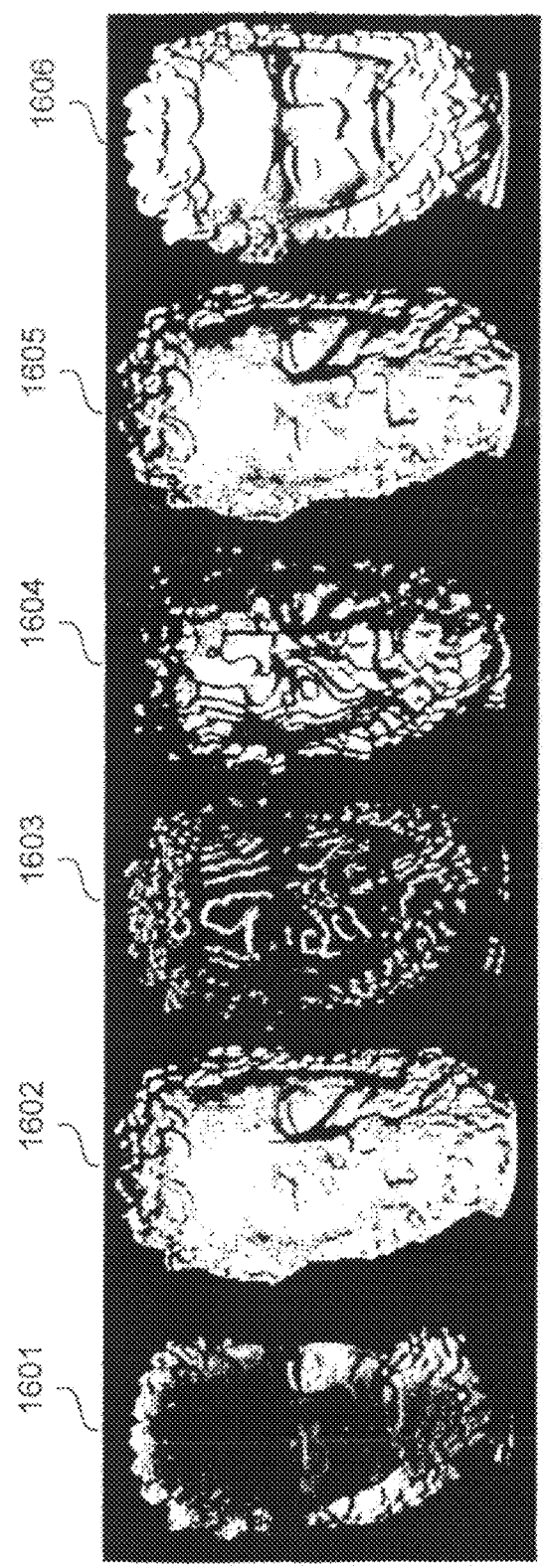
FIG. 16 is a set of images demonstrating a two-wavelength phase unwrapping.

FIG. 16 illustrates images which are results of the computation process for an illustrated Zeus sculpture with rich geometric features, using the two-wavelength method. The six images 1601-1606 of FIG. 16 show the general nature of two-wavelength phase unwrapping. Image 1601 is the holoimage of the Zeus bust with a $\lambda_1$ spatial frequency (i.e., the frequency of the projected fringe patterns) of 1 Hz. The reconstructed geometry obtained at $\lambda_1$ is shown in image 1602. This reconstructed geometry is coarse, of course, but phase unwrapping is unnecessary and it can be used as a reference to phase unwrap holoimages with denser (i.e., higher frequency) fringe patterns. Image 1603 is such a holoimage, obtained at a $\lambda_2$ spatial frequency of 64 Hz. Image 1604 shows the reconstructed geometry from holoimage 1603 without phase unwrapping. The solid contour lines are the phase jumping profiles. Image 1605 is the reconstructed geometric surfaces of image 1604 after phase unwrapping achieved by preserving depth consistency with image 1602. Image 1606 is the shading image (i.e., amplitude only—a conventional photographic image).

Figure 17:
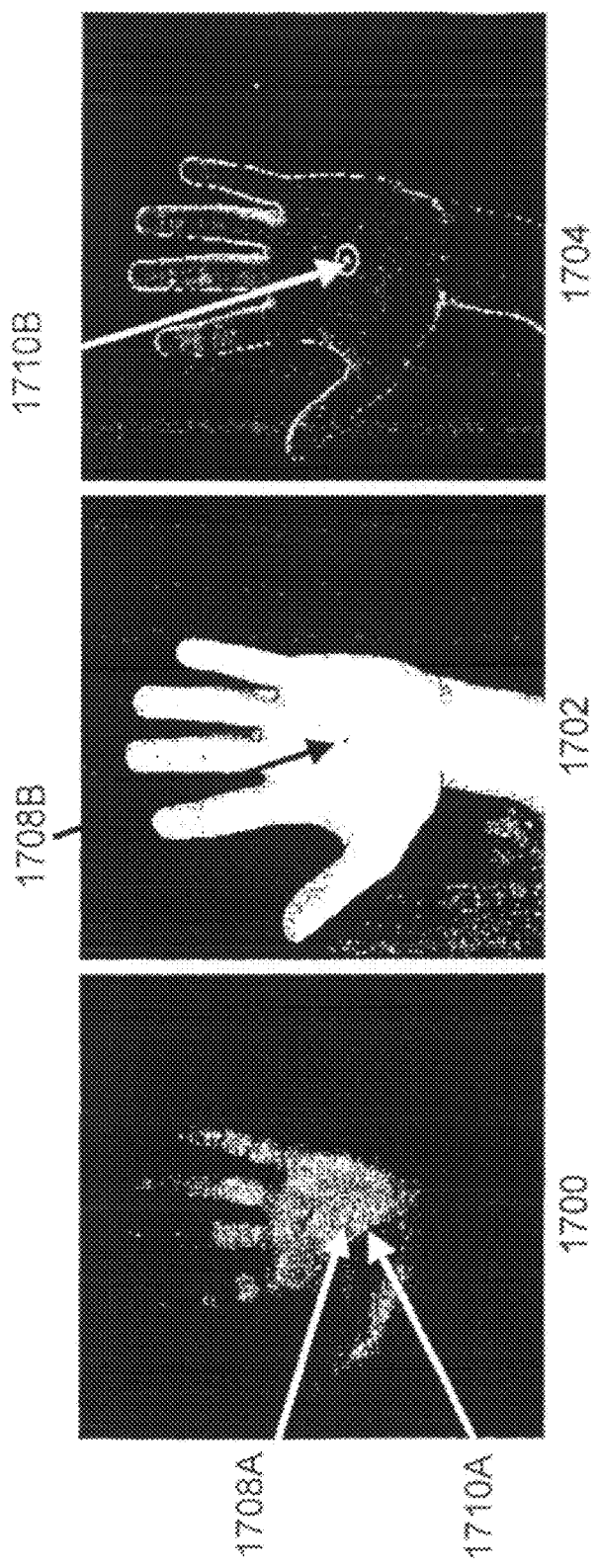
FIG. 17 is a set of images demonstrating detection of an encoded marker.

The unwrapped image produced by the quality-guided multi-level phase unwrapping algorithm is a relative unwrapped phase map. To obtain the absolute coordinates of the surface of the object, the absolute phase is required. In order to ascertain the absolute phase, an additional centerline image can be taken, as was done in the prior art. However, increasing the number of images used to reconstruct the 3D geometry decreases the measurement speed. Accordingly, a marker is preferably encoded in each of the projected illumination patterns, as was shown in FIGS. 7 and 9. Detecting the encoded marker enables calculation of the absolute phase, while maintaining the 3D geometry data acquisition speed sufficient for it to be considered real-time. To reduce measurement errors, in some embodiments, the size of the maker is chosen to be small. However, locating the small marker in a 2D image is generally difficult, especially if the image is blurred. FIG. 17 shows an example of detection of the marker. In image 1700, the marker 1708A (i.e., contrast enhanced) in the elliptical white window 1710A is barely visible. To detect the marker automatically, a gamma map is generated wherein the marker stands out more clearly. This is shown in image 1702, where the marker 1708B is shown as a dark spot on the lighter background of the hand. However, in general, detecting the marker from the gamma map is also difficult. Therefore, a mask is created based on the quality of data, computed using the above-described data modulation technique, and is used to remove the background. The gamma map is inverted: black to white, and vice versa. Image 1704, containing marker 1710B, shows the inverted gamma map after implementing the mask.

The encoded marker is detected by a marker detection algorithm in nature of a pattern recognition algorithm. Such algorithm may take advantage of a known epipolar geometry approach, according to which a point projected by the projector is always imaged onto one line, called a cross epipolar line, on the image taken by the camera, provided there is no camera lens distortion. Hence, before any measurement, the cross epipolar line on the camera image is calibrated and stored for future use. To calibrate the line, a large white planar object positioned at various distances from the camera is imaged. The centers of the crosses on this series of images are found, which form the epipolar line. The marker detection only needs to be carried out on the calibrated line, which makes the detection faster and more robust. In an aspect of the invention, a template-based method was used to find the marker center. An exemplary template is a 5×5 array. Experiments have shown that more than 99% of a number of markers can be correctly detected using the suggested method.

Once the phase $\phi_0$ of the marker is determined, the absolute phase $\phi_a(i,j)$ of each pixel can be obtained using the following equation:

$$\phi_a(i, j) = \phi(i, j) - \phi_0. \quad (21)$$

If not already available, after the absolute phase map is obtained, a unique point-to-line mapping between CCD camera pixels and pixels of the DMD of the DLP projector should be established. Once this relationship is established, the absolute coordinates of the measured object can be obtained.

Calibration of the Projector and Cameras

A previously published calibration method (Zhang, S., and Huang, P. S., "Novel Method for Structured Light System Calibration." Optical Engineering, 45, 2006), incorporated herein by reference, may be used. According to this method, the projector is enabled to "capture" images similarly to the camera, and thus can be calibrated in the same way as the camera. A camera calibration method is well established.

An illustrative example of the projector and camera calibration is given below. As an example, let 3×4 matrices $A^c$ and $A^p$ represent extrinsic and intrinsic parameter matrices of the camera and projector, respectively:

$$A^c = \begin{bmatrix} a^c_{11} & a^c_{12} & a^c_{13} & a^c_{14} \\ a^c_{21} & a^c_{22} & a^c_{23} & a^c_{24} \\ a^c_{31} & a^c_{32} & a^c_{33} & a^c_{34} \end{bmatrix}, \quad (22)$$

and $$A^p = \begin{bmatrix} a^p_{11} & a^p_{12} & a^p_{13} & a^p_{14} \\ a^p_{21} & a^p_{22} & a^p_{23} & a^p_{24} \\ a^p_{31} & a^p_{32} & a^p_{33} & a^p_{34} \end{bmatrix}. \quad (23)$$

These matrices include the translation and rotation matrices from the camera or projector coordinates to the world coordinate system. The relationships between the world coordinates (x, y, z), or the absolute coordinates, and the camera pixel coordinates $(u^c, v^c)$ and the DMD pixel coordinates $(u^p, v^p)$ are $$s^c[u^c \ v^c \ 1]^T = A^c[x \ y \ z \ 1]^T, \quad (24)$$

and $$s^p[u^p \ v^p \ 1]^T = A^p[x \ y \ z \ 1]^T, \quad (25)$$

where $s^c$, $s^p$ are camera and projector scaling factors, respectively.

Once the absolute phase $\phi_a$ is obtained, the relationship between the camera coordinates and the projector coordinates can be established as:

$$\phi_a^c(u^c, v^c) = \phi_a^p(u^p). \quad (26)$$

where $\phi_a^c$ is an absolute phase of a camera pixel.

Because the projected fringe images are composed of uniform stripes, and assuming that a fringe image has a fringe pitch P, which is the number of pixels per fringe period, and the total number of pixels in the x direction is $W^p$, the following can be obtained:

$$u^p = \phi_a^c P / 2\pi + W^p / 2, \quad (27)$$

where $u^p$ is a vertical line on the image captured by the DMD, which has the same absolute phase value as an arbitrary point $(u^c, v^c)$ on the camera image.

Term $W^p/2$ in this equation is used to convert the center of the projected fringe image to the absolute phase 0.

From Eqs. (22)-(27), the absolute coordinates are calculated as follows:

$$\begin{bmatrix} x \\ y \\ z \end{bmatrix} = \begin{bmatrix} a^c_{11} - u^c a^c_{31} & a^c_{12} - u^c a^c_{32} & a^c_{13} - u^c a^c_{33} \\ a^c_{21} - v^c a^c_{31} & a^c_{22} - v^c a^c_{32} & a^c_{23} - v^c a^c_{33} \\ a^p_{11} - u^p a^p_{31} & a^p_{12} - u^p a^p_{32} & a^p_{13} - u^p a^p_{33} \end{bmatrix}^{-1} \begin{bmatrix} u^c a^c_{34} - a^c_{14} \\ v^c a^c_{34} - a^c_{24} \\ u^p a^p_{34} - a^p_{14} \end{bmatrix}. \quad (28)$$

The calculations involve mathematically-intensive matrix computations. If all of the computations are done by the CPU, the real-time reconstruction and display will be difficult to achieve on an ordinary desktop computer.

GPU-Assisted 3D Surface Measurement

Accordingly, a graphics processing unit (GPU) may be employed to perform the computations of the absolute coordinates from the absolute phase more efficiently, offloading this task from the CPU. Using the GPU achieves a real-time coordinate computation and rendering. A GPU is a microprocessor that has been designed primarily for the processing of 3D graphics. A GPU is typically built with integrated transform, lighting, triangle setup/clipping, and rendering engines, capable of handling millions of mathematically-intensive processes per second.

Figure 18:
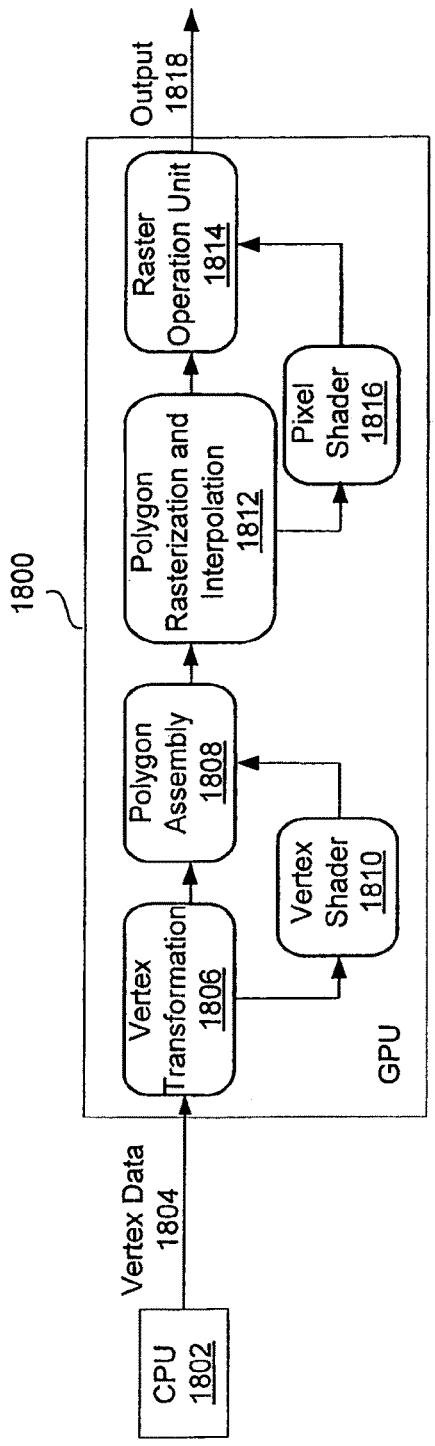
FIG. 18 is a flowchart of a GPU pipeline.
Figure 19:
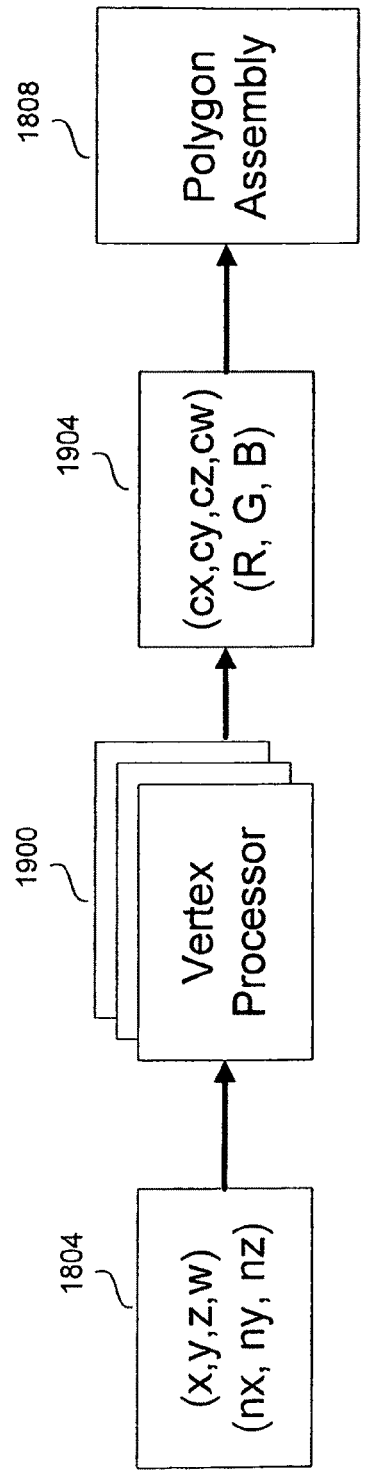
FIG. 19 is a first flowchart of absolute coordinate computation by a vertex shader.

Embodiments of the present invention employ a GPU in order to assist the CPU in performing computation-intensive calculations. Each pixel in the absolute phase map contains an absolute phase value. The goal is to convert this map into absolute coordinates of the surface of the object. Referring to FIG. 18, a GPU pipeline, adopted in some embodiments, is shown. A CPU 1802 sends input vertex data 1804 to a GPU 1800. FIG. 19 shows that each data point in the input vertex data 1804 is represented as the position in the homogeneous coordinate form of (x, y, z, w) and a normal (nx, ny, nz). Referring again to FIG. 18, the GPU 1800 generates a lighting for each vertex, creates polygons and rasterizes their pixels, and, then, outputs the rasterized image 1818 to a display screen (not shown). The GPU 1800 allows a user specified code to be executed within both the vertex and pixel sections of the pipeline, which are called a vertex shader 1810 and a pixel shader 1816, respectively. A vertex shader is a computer program for graphics processing that is used to add special effects to objects in a 3D space by performing mathematical operations on the objects' vertex data. A vertex shader 1810 is applied to each vertex and is run on a programmable vertex processor, schematically shown at 1900 in FIG. 19. The GPU can have multiple vertex processors. Thus, a 425 MHz Quadro FX 3450 GPU, employed in some embodiments of the invention, has eight vertex processors acting in parallel. A vertex transformation step 1806 performed by vertex shader 1810, run on multiple programmable vertex processors 1900, is explained in more detail in FIG. 19. Vertex shaders are responsible for calculating the clip-space coordinates and color for each vertex of an image. In FIG. 19, vertex shader 1810 generates clip space coordinates (cx, cy, cz, cw), shown at 1904, by multiplying the input coordinates by a model-view matrix (not shown). The model-view matrix keeps track of the position of the camera relative to transformations, rotations, scales and translations, performed on an object. In order to visualize each vertex, it needs to be assigned a color. Thus, vertex shader 1810 computes the vertex color from the lighting condition in the form of (R, G, B), as shown at 1904. In a polygon assembly step 1808, the vertices are assembled into polygon vertices, based on their incoming order. GPU 1800 automatically handles the transfer of streaming data by parallel computation. Although the clock rate of a GPU is generally significantly slower than that of a CPU (for example, the 425 MHz Quadro FX 3450 GPU compared to a 3.4 GHz Pentium 4 CPU), its multiple vertex processors acting in parallel may provide the throughput of the GPU exceeding that of the CPU. As GPUs increase in complexity, the number of vertex processors also increases, thus leading to performance improvements.

Referring again to FIG. 18, upon completion of the polygon assembly at step 1808, polygon rasterization and interpolation step 1812 takes place. During rasterization, each polygon is drawn pixel-by-pixel. Pixel shaders are mostly used to compute color properties of each pixel. They typically have much more processing power than their vertex-oriented counterparts. A pixel shader 1816 is applied to each pixel of the created polygons and is run by multiple pixel shader units (not shown). The NVidia Quadro FX 3450 graphics card, used in some embodiments, has 24 pixel shader units. The output of the pixel shader undergoes additional processing in a raster operation unit 1814, which is not discussed further.

Figure 20:
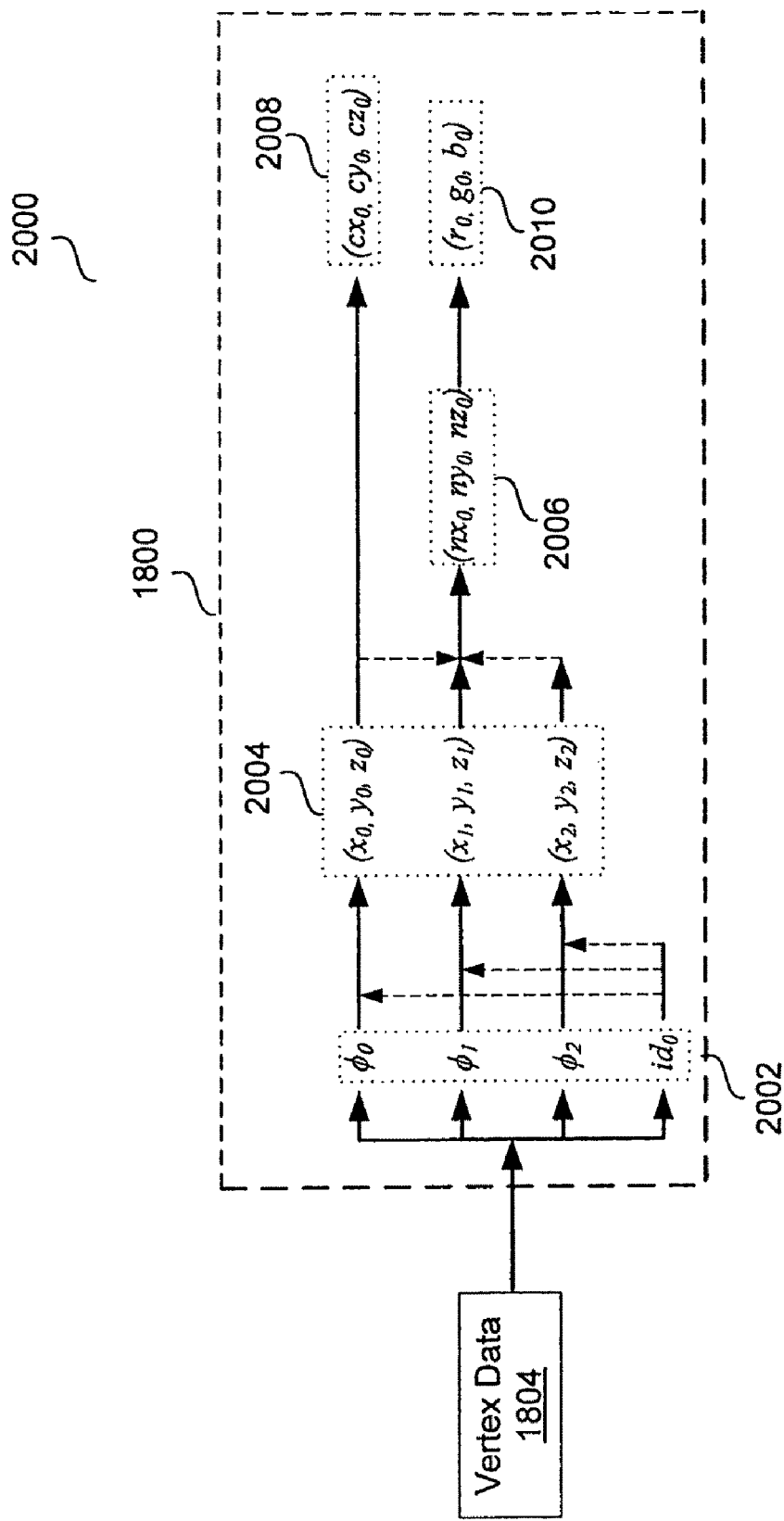
FIG. 20 is a second flowchart of absolute coordinate computation by a vertex shader.

Referring to FIG. 20, a vertex shader 2000, according to some embodiments, is employed within GPU 1800 to compute the absolute coordinates, a normal and color for each vertex. In these embodiments, the vertex data are represented as a dummy grid mesh, with the same connectivity as the object surface. The "coordinates" assigned to each input vertex are the absolute phase values of the pixels of the absolute phase map and a grid index of the vertex. As was shown in FIG. 19, the position coordinates of each point in the input vertex data have four components. Therefore, absolute phases of three neighboring vertices of a triangle in the dummy grid mesh and an associated index of the triangle comprise a vertex position vector 2002. It should be understood that a vertex of the triangle in the dummy grid contains three absolute phase values of the corresponding three pixels in the absolute phase map. This vertex should be discerned from the vertex data which are the input to the GPU and wherein each vertex is represented as the above-described triangle and the index of the triangle.

In FIG. 20, the three vertices of a triangle, defined as $v_0$, $v_1$, and $v_2$, have the absolute phases of $\phi_0$, $\phi_1$, and $\phi_2$, respectively, and $v_0$ has an index $id_0$. Therefore, a vertex position vector 1902 is defined as $(\phi_0, \phi_1, \phi_2, id_0)$. Because the relationship between the three vertices of the triangle is known, the indices of the other two vertices, $v_1$, and $v_2$, are uniquely determined from the index of $v_0$. Once the absolute coordinates 2004 are ascertained, a vertex normal 2006 for the vertex $v_0$ can be computed from the three vertices of the triangle. Once the vertex normal 2006 is known, GPU 1800 generates clip-space coordinates 2008 and, from the light condition setup, a color 2010 for the vertex.

Table 1 shows a comparison of results of absolute coordinate computation and rendering using a CPU alone and a CPU assisted by a GPU. In these experiments, a program code was written in C++ under Microsoft Visual C++.net 2005 environment and identical conditions were used to assess the performances of the two approaches. From the table, it is apparent that the GPU boosts the computation and rendering speed. For the full resolution image (532×500), the NVidia Quadro FX 3450 graphics card can process 25.56 fps, while the 3.4 GHz CPU, using same graphics card to display the results, can process only 6 fps. Here, the speed of the GPU is more than 4 times faster than that of the CPU. Furthermore, in real measurements of the human face, only about half of the pixels needs to be rendered, since the background is not displayed. Thus, the GPU-assisted 3D shape measurement can achieve a speed of more than 30 fps. It should be noted that even with a relatively inexpensive ATI 9800 XT graphics card, computing and rendering one quarter of the points of an image of an object can be as fast as 53.37 fps, which exceed the 30 fps speed, considered sufficient to provide real-time 3D data acquisition.

TABLE 1

| Image Size | CPU (fps) | | GPU (fps) | | |
|---|---|---|---|---|---|
| | 3.2 GHz | 3.4 GHz | ATI 9800 XT | Quadro FX 1400 | Quadro FX 3450 |
| 532 × 500 | 5.50 | 6.00 | 13.56 | 20.35 | 25.56 |
| 266 × 250 | 21.28 | 23.15 | 53.37 | 78.05 | 102.81 |
| 177 × 167 | 46.50 | 51.06 | 111.29 | 157.71 | 222.56 |
| 133 × 125 | 79.50 | 89.93 | 179.45 | 246.15 | 372.82 |

Note:
Quadro EX 1400 and Qudro FX 3450 are NVidia graphics cards. The computers are Dell Precision 670 Workstations with Dual CPUs, Pentium 4, 3.2 GHz and 3.4 GHz respectively.

Evaluation of Holoimage

The accuracy of the reconstructed geometry provided by a holoimage is determined by many factors. Some direct factors are: the image resolution (m×m), the pixel bit-depth n, the fringe spatial frequency μ, and the projection angle θ. Assume there is a one-bit error at a specific pixel in the holoimage. The reconstructed geometric error is $$\delta z = \frac{1}{\mu 2^n \sin\theta}. \tag{29}$$

From this formula, it is evident that the accuracy can be increased by increasing the projection fringe spatial frequency. In reality, the spatial frequency has its upper limit determined by the resolution of the projector and the resolution of the camera. Similarly, increasing the projection angle θ will improve the accuracy of the reconstructed geometry but it will also increase the occluded regions (e.g., regions shaded by features of the object).

Figure 21:
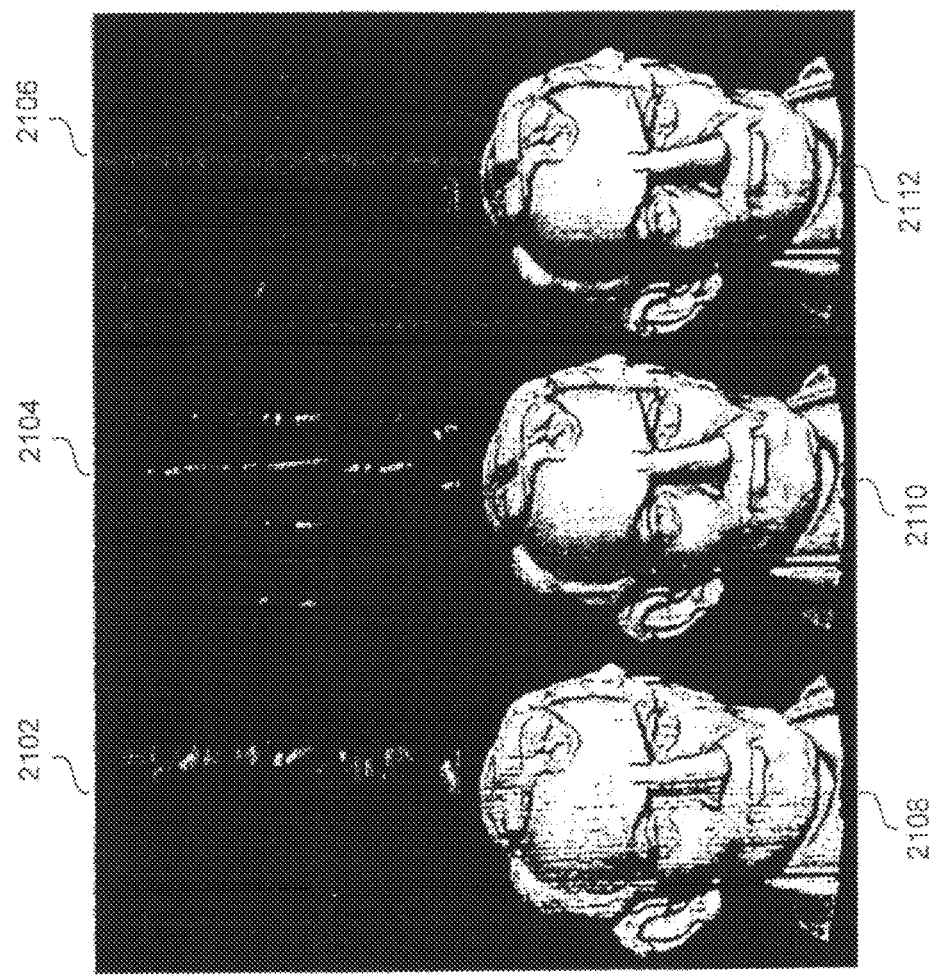
FIG. 21 is a set of images that demonstrate the influence of projection angle and spatial frequency on the Holoimage quality.

The effects of different parameters are illustrated in FIG. 21. Images 2102, 2104, 2108, and 2110 were created (generated) at the same projection angle, 15°, but different spatial frequencies, 2 Hz (images 2102 and 2104) and 8 Hz (images 2108 and 2110). Images 2102, 2108, 2106 and 2112 were generated at the same spatial frequency (2 Hz) but different projection angles, 15° (images 2102, 2108) and 80° (images 2106, 2112). The differences are apparent. (It should be understood that the projection angle of 80° was a "generated" angle in a computer implementation and that such a large projection angle is probably not practical in an optical projection system since some features of the subject object, a head, would occlude other features or areas. Nevertheless, these images show the impact of parametric selections. Indeed, all of the images in FIG. 21 are similarly computer generated.)

Comparison with Geometry Images

Conventional geometry images (a kind of a regular mesh) and depth images encode the depth information using color information. The geometric error can be formulated as $\delta z=1/m2"$. Compared with Eq. 29, it is obvious that if $\mu \sin \theta \gg 1$, the geometric accuracy of a holoimage is much higher. In practice, $\mu$ may be chosen as 128, and $\theta$ is around 30 degrees. Therefore, such a holoimage is 64 times more accurate than a corresponding geometry image. Common 24-bit image formats thus are good enough for storing the geometric information in a holoimage, which is not possible for geometry images.

Generated (i.e., Virtual) Holoimages

Figure 22:
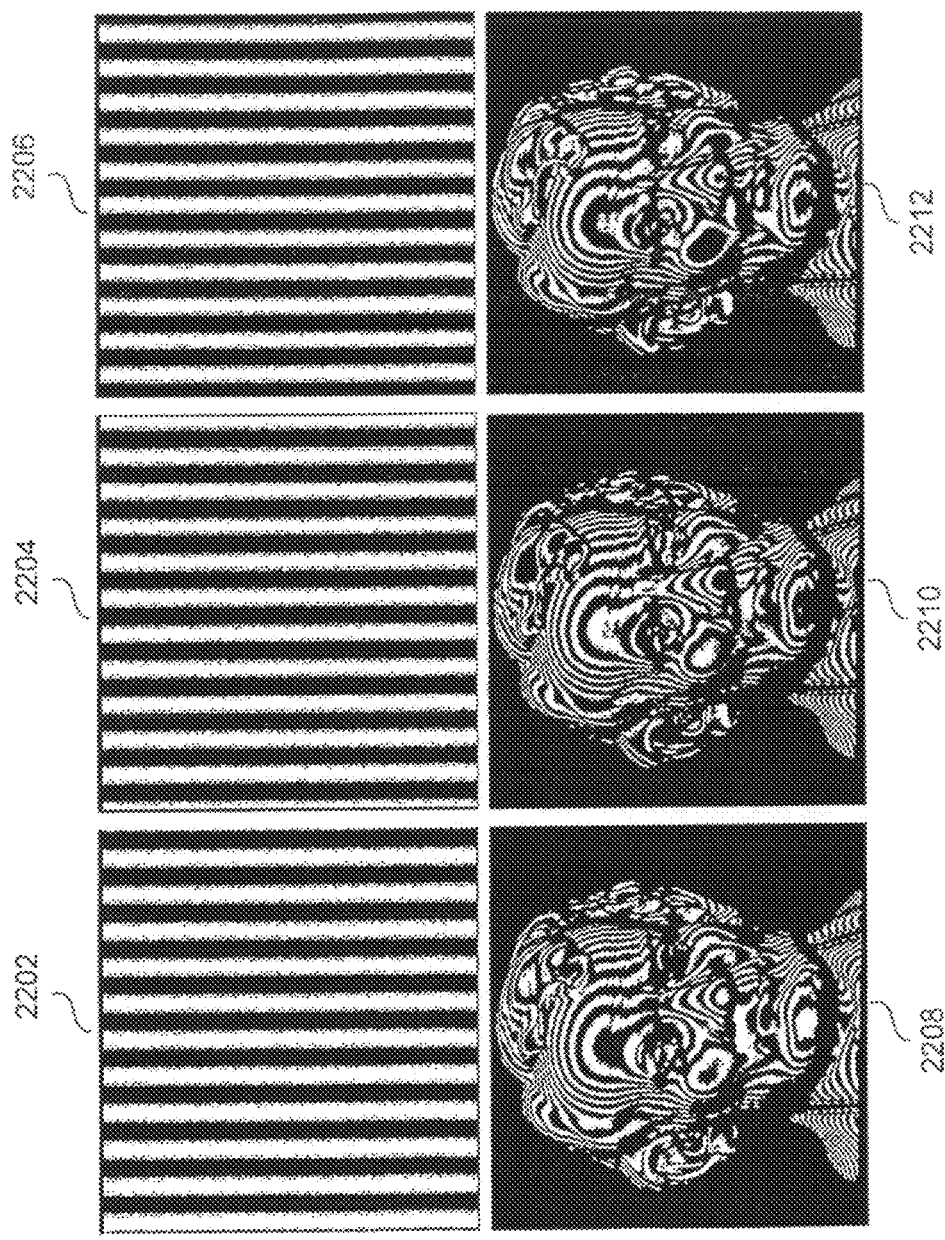
FIG. 22 is a set of fringe patterns and a set of images that demonstrates three color channels of the encoded the Holoimage.

It is relatively easy to synthesize (i.e., generate) a holoimage using a modern graphics pipeline, thus simulating what would occur in a physical projector/camera arrangement (and even performing operations that would not be realistic with a physical projector/camera arrangement). As shown in FIG. 22, for example, three sinusoidal fringe patterns 2202, 2204 and 2206 can be precomputed and stored as a 3-channel 24-bit color texture image. The interaction between a virtual object, represented as a surface model in a computer, and the simulated incident light pattern can be computed, yielding a phase-shifted simulated output and a simulated shading image as shown at 2208, 2210 and 2212. The phase and shading data may be combined in the same way as such data provided from a physical camera, to yield a holoimage.

In order to simplify the analysis of the holoimage, a canonical configuration is preferred, where both the projective texture and the camera use orthogonal projection, and the geometric object is normalized to be inside a unit cube. In the computations, moreover, if one is only interested in obtaining the phase information and is willing to ignore the shading or the texture, it is possible to set the texture environment mode as a replacement mode in a graphics processing unit. If one wants to encode both geometry and shading information, the texture environment mode in Open GL, for example, can be set to modulate the image so that shading and phase information are combined. If the surface has its own texture, it may be advisable to use a multitexturing technique to generate the holoimage. For color shading information, a rendered image can be kept without project texture as a texture image for the reconstructed geometry.

Figure 23:
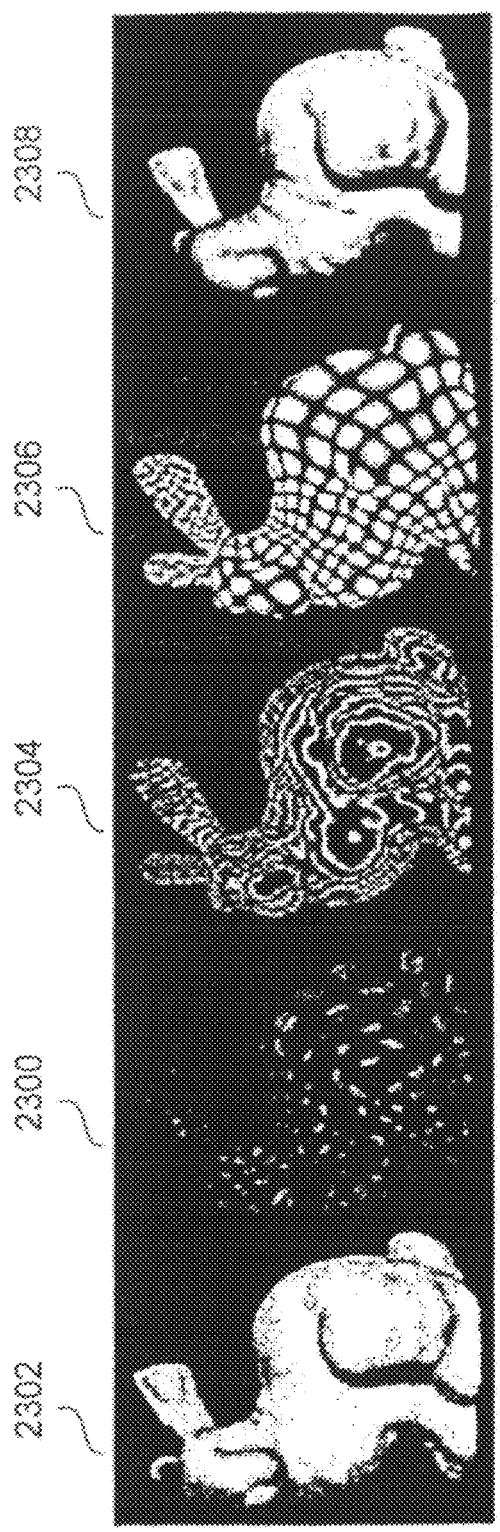
FIG. 23 demonstrates a capability of extracting both 3D geometry and texture from a single Holoimage.

FIG. 23 illustrates a holoimage 2300 which represents geometry with a complicated texture. The holoimage is synthesized in the following procedure: first, a well-known Stanford bunny surface was parameterized using conformal parameterizations, then an arbitrary monochromatic bitmap was texture mapped onto it, after which color sinusoidal fringes were shaded onto the bunny using projective texture mapping. These two textures were combined using a multitexturing technique, producing the geometric surface at 2302. Specifically, an ARB multitexture extension of OpenGL was used on a Nvidia GeForce 6800 graphics card, setting the texture environment mode to modulate, to blend the surface texture color and the fringe pattern. The image 2302 is flat shaded, the flat triangles being visible. A corresponding 24-bit holoimage is shown at 2300. At 2304, an image of the phase map only is shown. At image 2306, the texture is reconstructed from the holoimage. The geometry reconstructed from the holoimage is shown at 2308, with the flat triangles recovered.

For more realistic rendering of the object surface, a color texture mapping method may be used. A color image without fringes can be obtained by setting the exposure time of the color camera to one projection channel time, or 2.78 ms, to capture the flat image.

If the coordinate system for the B/W camera(s) and the color camera(s) are the same, the relationship between the color camera and the B/W camera can be established by calibration. Since the absolute coordinates of the object can be measured, the coordinates of the measured object relative to the color camera can be obtained after obtaining the relationship between the color camera and the B/W camera. After the absolute coordinates are known, the relationship between the color image and the 3D object point can be found; hence the color of each point on the 3D object can be calculated by use of a conventional lens imaging formula.

Assume the color camera imaging matrix is P, which is the perspective projection matrix, including the intrinsic and extrinsic parameters of the camera. Matrix P can be obtained by ordinary camera calibration. For each 3D point X= $[x, y, z, 1]^T$, and the corresponding color image point is:

$$I^c(x, y)=PX,$$

which is the corresponding color information for that 3D point.

It should be noted that a B/W image also can be obtained for the texture map by averaging the three phase-shifted fringe patterns. Since no additional images, B/W or color, need to be taken, this method is the fastest.

Rendering Holoimages

A holoimage represents both shading and geometry within the same image. That is, each pixel encodes both phase and amplitude information. When a conventional 24-bit format is used, two eight-bit portions may store phase data, for example, and one eight-bit portion may store shading data.

Recent developments in graphics hardware make it feasible to efficiently render holoimages directly—i.e., completely in a computer, with a virtual projector and virtual camera, using a programmable pipeline. For rendering purposes, holoimages may have the potential to replace traditional meshes, and therefore, simplify the architecture of GPUs.

Surface Reconstruction from Holoimages

For surface reconstruction, holoimages present a good match between the computational requirements for image quality and the capabilities of graphics processors, and promise a significant acceleration as compared with the use of only a general-purpose CPU. Suitable surface reconstruction algorithms require high-intensity and accurate numerical computations, with a complete grid pattern, and satisfy SIMD semantics. Therefore, such a reconstruction algorithm can be efficiently accelerated on high performance graphics processors (GPUs) such as the nVIDIA GeForce 6800 and ATI Radeon 9800, which expose a flexible SIMD programming interface with powerful floating computational capacity.

Figure 24:
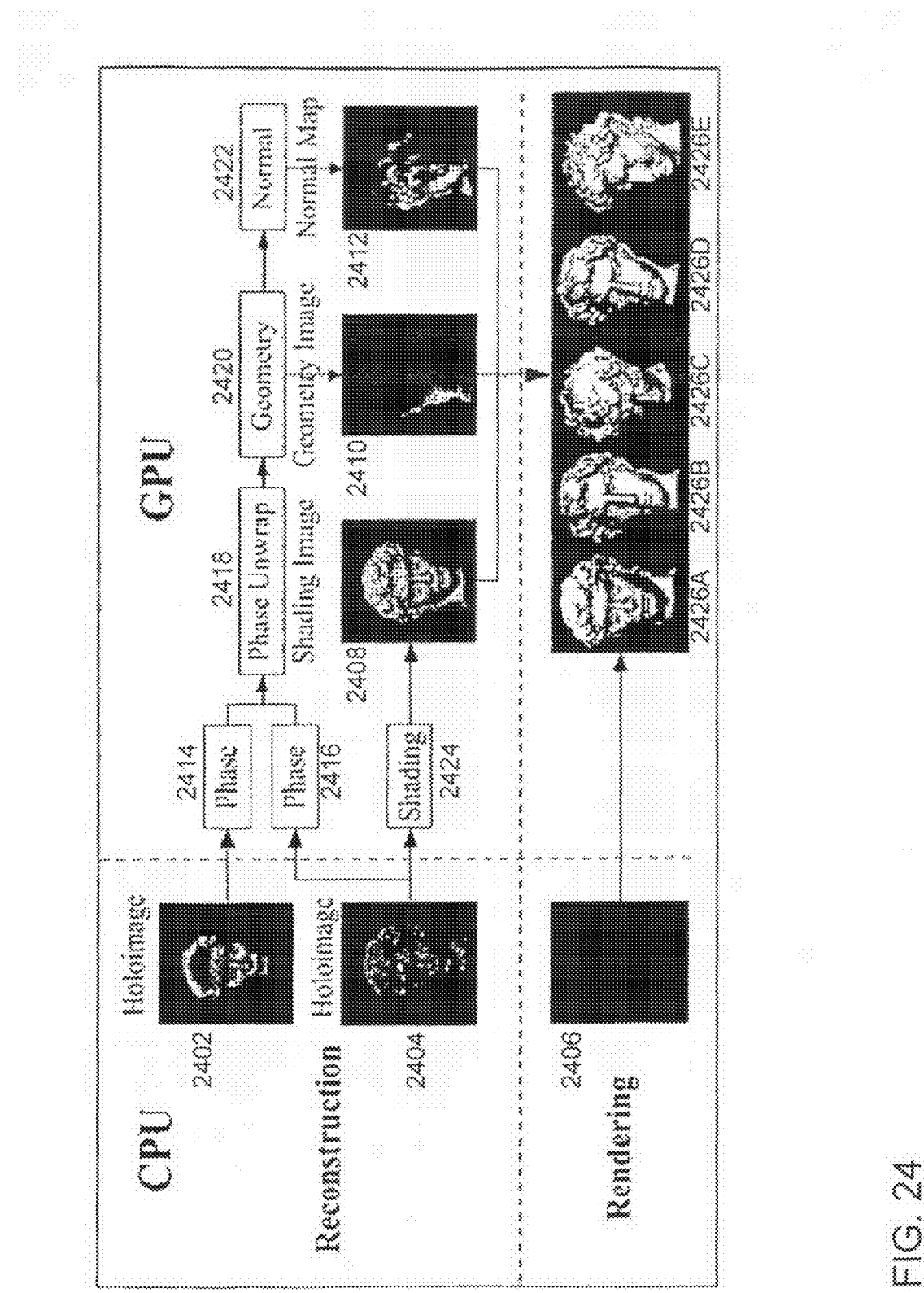
FIG. 24 is the pipeline for reconstructing and rendering 3D surfaces from Holoimage on GPU.

The surface reconstruction may be mapped to the graphics hardware as illustrated in FIG. 24. The original holoimages 2402 and 2404 are first uploaded from the CPU to the GPU as textures. Then, a series of GPU computation-intensive kernels (pixel shaders) are sequentially applied to the original and intermediate generated textures. Each pixel shader processes (in parallel) each texel (texture element) and produces one element to the intermediate texture for the next processing stage. First, phases 2414 and 2416 are obtained from respective holoimages 2402 and 2404. Subsequently, phase unwrapping 2418 produces an image 2408, after which geometry is extracted at 2420 to produce geometry image 2410. Normal kernel within a pixel shader generates a normal map 2412. The results, including a geometry image 2410, shading image 2408, and normal map 2412, reside in the GPU memory (not shown) for further rendering.

Such surface reconstruction has an attractive property of local memory access. Pixel shaders need not access any adjacent texel, except for the normal kernel, which employs the regular memory access pattern of eight closest neighbors. Because streaming hardware can effectively hide the latency of memory access, this GPU-based approach for simple and regular memory fetching operations is relatively inexpensive compared to CPU-based versions.

The holoimage rendering is efficient in part because it does not need to read back from the GPU to the CPU the reconstructed images, and thus overcomes a common performance bottleneck within GPU accelerated systems. To render the recovered surface, the system issues a dummy grid mesh 2406 to the GPU, which has the same connectivity as the object surface but fake geometric and shading information. The texture coordinates assigned to each input vertex encode its grid indices. The true geometry position, shading color, and normal vector are fetched for each vertex from GPU memory, by pre-assigned texture coordinates, and the transformed position and lighting color are computed. The exemplary rendering results are shown as images 2426A-E. In practice, the rendering can be further optimized by drawing indexed primitives, which can reduce the number of executions of some of the programs.

The efficient GPU-based surface reconstruction and rendering for holoimages reveals that by representing geometry, shading and normal information of surfaces with images, holoimages may be used to replace triangle meshes for rendering purposes. Also, the holoimages have the potential to simplify the architecture of modern graphics hardware.

Geometric Processing

By using holoimage representations, many geometric processing tasks can be accomplished by image processing techniques, which can be accomplished using graphics hardware efficiently. Because the geometry is encoded by the phase, one can operate on the phase information directly. The phase of a holoimage can be described using a phase map $e^{i\psi(x, y)}$, namely a map from plane $R^2$ to the unit circle $S^1$, $\sigma: R^2 \rightarrow S^1$, $\sigma(x, y) = e^{i\psi(x, y)}$. Two phase maps can be composed together by pixelwise multiplication or division. Then the set of phase maps forms a group $$\Sigma = \{e^{i\psi(x,y)}\}, \sigma_1 \circ \sigma_2 = \sigma_1(x, y)\sigma_2(x, y).$$

By composing two phase maps of two surfaces, it is very easy to generate embossing and engraving by GPU.

For example, represent a phase map by a 16-bit image, the red and blue channels being given by:

$$r(x, y) = 128 \cos \psi(x, y) + 128,$$

$$b(x, y) = 128 \sin \psi(x, y) + 128.$$

Then the wrapped phase $\psi(x, y)$ can be simply computed as $$\psi(x, y) = \tan^{-1} \frac{b(x, y) - 128}{r(x, y) - 128}.$$

Embossing and Engraving

Figure 25:
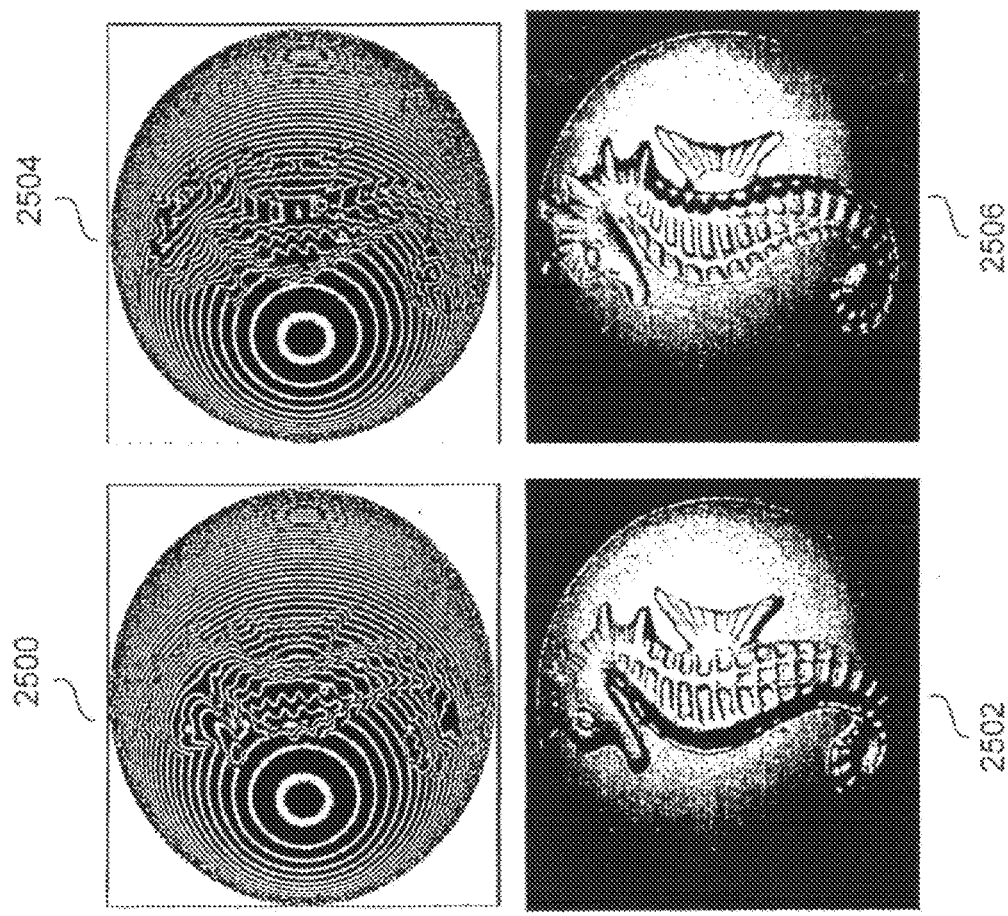
FIG. 25 demonstrates a capability of editing geometry using by editing Holoimage.
Figure 26:
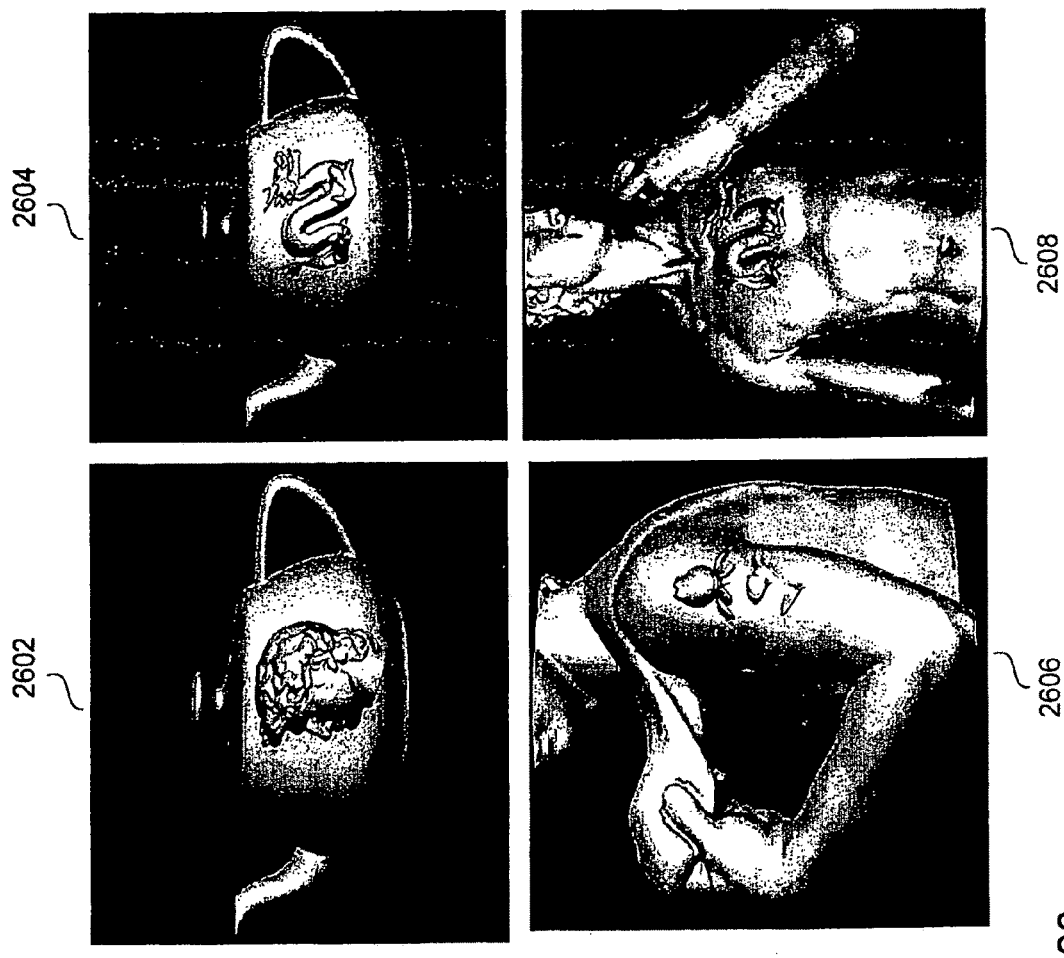
FIG. 26 demonstrates a result of engraving and embossing using the Holoimage technique.

Embossing is implemented by multiplying two phase maps. FIGS. 25 and 26 illustrate several examples of embossing and engraving. Particularly, FIG. 25 shows an example of a phase map 2500, a geometric embossing 2502, and a phase map of difference 2504 and a geometric engraving 2506. FIG. 26 contains examples of embossings at 2602-2608.

The following can be presented as an example of steps of an embossing or engraving process:
1. Choose the camera position and zooming factor for the two surfaces.
2. Render the holoimages of the two surfaces with two wavelengths.
3. Compute the wrapped phase of each holoimage.
4. Convert the wrapped phases to phase maps, multiply the corresponding phase maps of different surfaces as to produce a combined surface.
5. Compute the unwrapped phase of the combined surface using the two-wavelength process presented above.
6. Convert the unwrapped phase to a geometric surface.

All such operations are performed pixel-by-pixel without requiring information from neighboring pixels. Therefore the whole algorithm can be implemented by a GPU.

Geometric Texture Extraction

Figure 27:
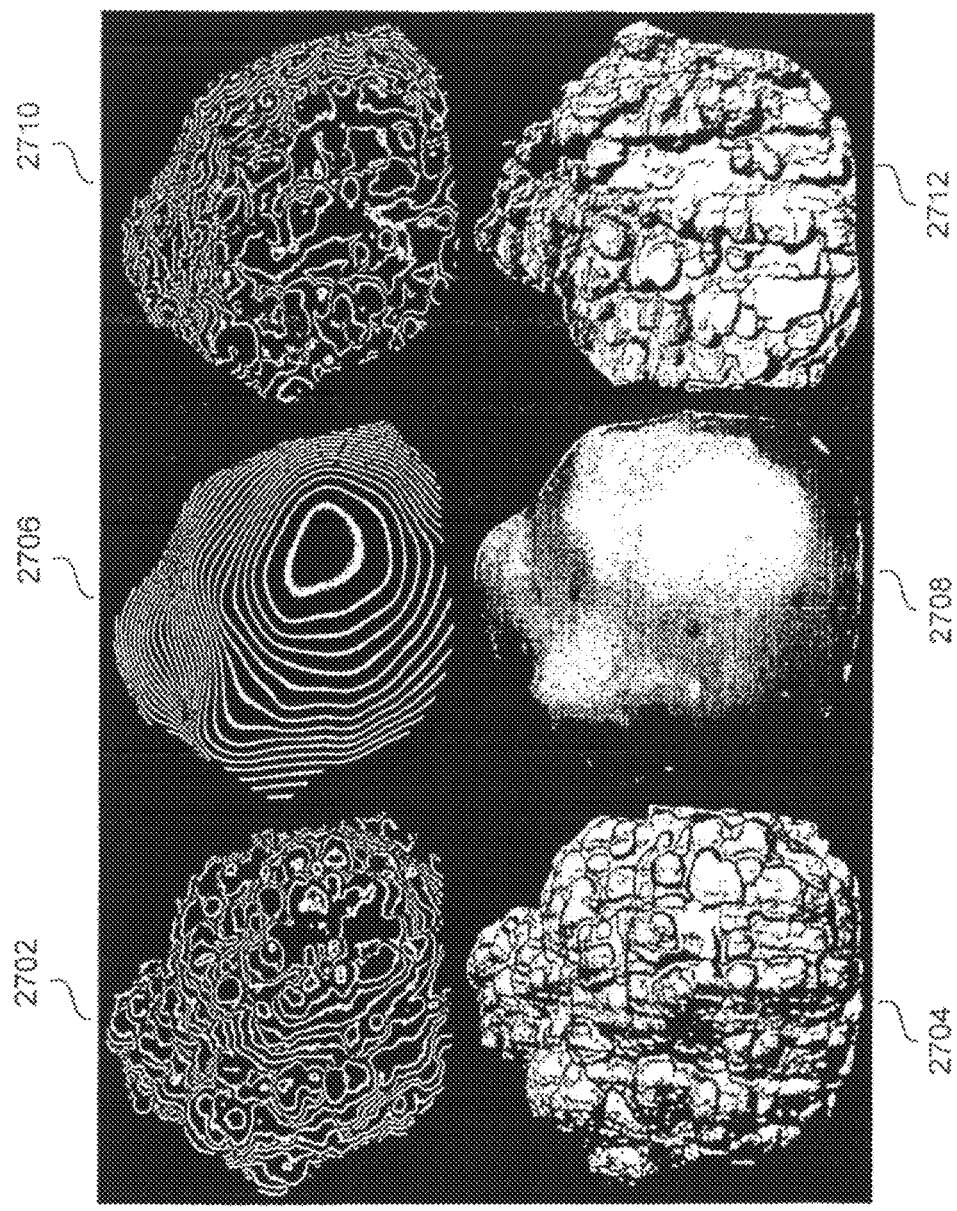
FIG. 27 illustrates geometric texture extraction.
Figure 28:
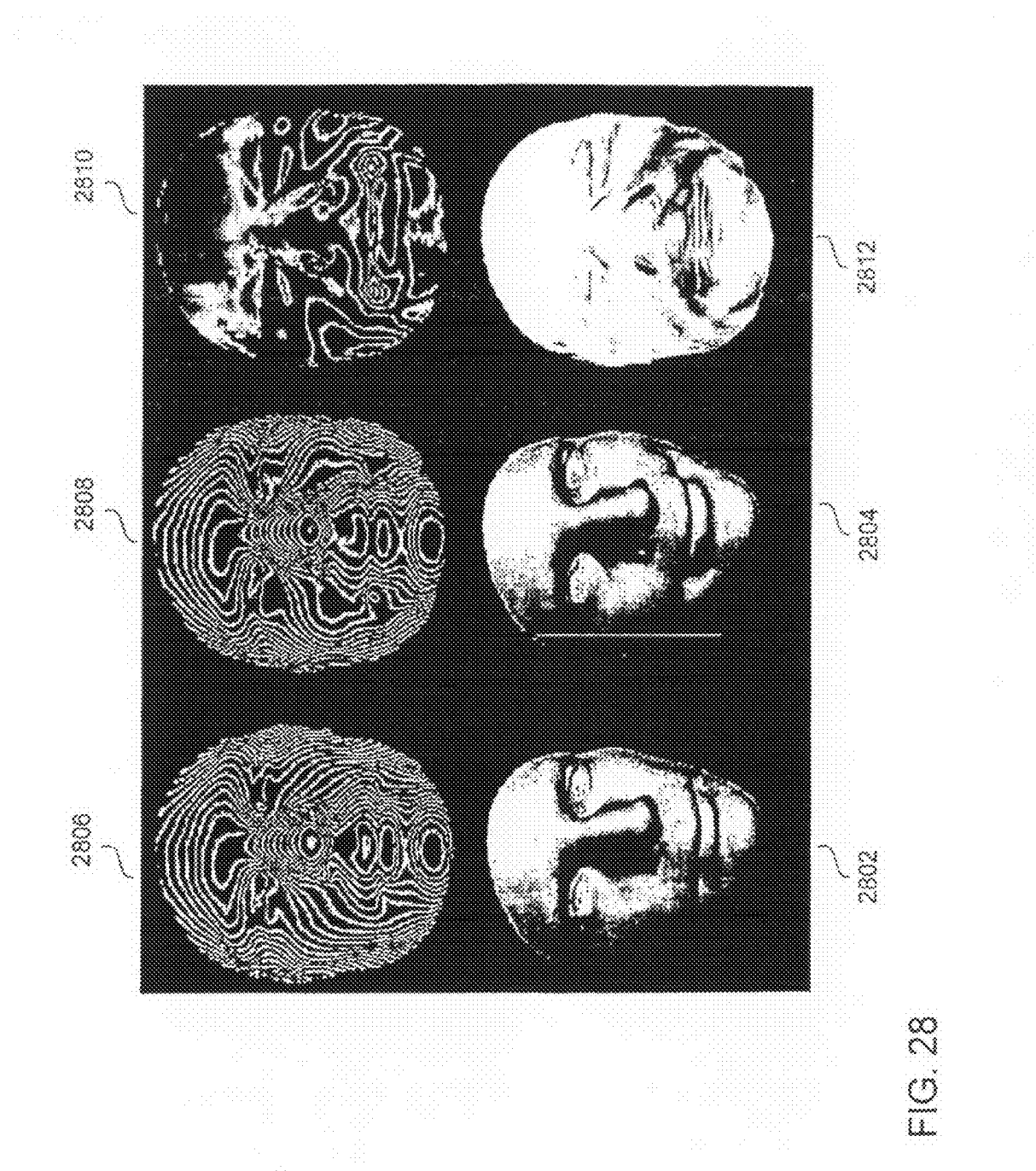
FIG. 28 illustrates distortion measurement.

Textures are important for geometric modeling. Although it is easy to capture image textures, it is generally difficult to capture geometric textures. It is desirable to extract the geometric texture from a real surface with complicated profiles and transfer the texture to a geometric model. By using holoimages, geometric textures can be extracted from real objects easily. As an example, a complex surface may be scanned and the geometry reconstructed. By using conventional geometry smoothing techniques, the geometric texture can be removed from the surface. Then, by subtracting the smooth surface from the original surface, the geometric texture can be extracted. This process is illustrated in FIG. 27, which shows an original holoimage 2702, an original geometry image 2708, a holoimage 2706 of smoothed geometry, a smoothed geometry image 2708, extracted texture holoimage 2710, and extracted texture 2712.

Deformation Measurement

It is useful to detect and measure deformation of surfaces to model human facial expressions and muscle movements. FIG. 22 shows an interesting application of holoimages, "a smile without a face." A human face with different expressions was captured. Two frames were selected, one face being calm (shown at 2802), the other having a smile (shown at 2804). By converting both of them to respective phase maps shown at 2806 and 2808, respectively, a difference phase map (shown at 2810), and reconstructing the geometry, "a smile without a face" can be obtained, as depicted at 2812. From the deformation phase map, it is clear that the lips of the mouth change the most, the muscles on the cheeks change moderately, and the forehead and the nose bridge remain unchanged.

Thus, a novel geometric object representation called the holoimage has been shown. It encodes both amplitude and phase information in a single image. Compared to conventional geometry images and depth images, holoimages have much higher geometric accuracy, and can be stored and transmitted using common image formats.

Holoimages can be synthesized using a conventional graphics pipeline or captured from real life with simple hardware, at reasonably fast speed. The algorithms to reconstruct a surface from a holoimage are simple and can be accomplished in readily available graphics hardware.

Holoimages can be efficiently rendered using a GPU directly. Holoimage based rendering is mesh-free and has the potential to simplify GPU architecture.

The capture of phase information to represent 3D surfaces is of limited value without a way to store an image representation. Furtunately, there exists a way to represent and store both phase and amplitude information conveniently and efficiently. Less memory is needed than for an equivalent mesh, and the images are easy to process and manipulate. This representation is called a "holoimage." Holoimages are based on the principles of wave optics. Whether completely computer-generated (i.e., virtual) or of camera origin (hereafter referred to as computer-camera and optical-camera, respectively), they thus inherit some drawbacks from the realm of optics. However, there are also limitations to the optical-camera system that are not present in the computer-camera system. The latter, being a virtual simulation of what an optical-camera system would create, can sometimes simulate conditions not achievable in the real physical world.

Among the limitations of holoimages are:

1. Occlusion—A holoimage can only represent the visible part of a surface. In order to represent the whole surface, multiple holoimages are required.

2. Materials Limits—For 3D data acquisition, dark or glossy materials can not be captured accurately.

Embodiments of the invention have been described with reference to the drawings. It should be appreciated that other embodiments of the present invention are possible due to various alterations, modifications, and improvements. Such alterations, modifications, and improvements are intended to be part of this disclosure, and are intended to be within the spirit and scope of the invention. Accordingly, the foregoing description and drawings are by way of example only.

In view of the above-stated, it should be appreciated that fringe images can be generated using methods other than a digital technique and using apparatus other than those containing DMDs. For example, traditional mechanical gratings may be used. Various other gratings may be employed as well. Also, a liquid crystal display (LCD) projector can be utilized to generate the fringe patterns and provide the functionality of a projector. A liquid crystal grating (LCG) and a flash light, separated from or co-housed with the camera, can be substituted for the signal generator and projector. A scanning laser can also be used to generate the fringe patterns. Therefore, a laser with a modulator, perhaps housed in the camera, can also be substituted for the signal generator and projector. Moreover, the fringe images can be generated by using various traditional interference methods.

As technology advances, faster cameras can be employed to capture reflected fringe images. Embodiments of the invention are not limited to utilizing a CCD camera. Thus, a CMOS camera, a scanner, or other image acquisition devices can be used. Two or more cameras or pairs of cameras can be used to capture wide areas, as was described above. Various projectors can be employed as well. In addition, different calibration techniques can be exploited. In addition, synchronization between projector(s) and camera(s) can be realized -by various methods. For example, a trigger signal to the camera(s) can be synchronized by probing a trigger signal of the projector(s).

Embodiments of the invention shown in the drawings adopted the 2+1 phase-shifting algorithm where fringe profiles are sinusoidal. It should be understood that the fringe profiles can be of other shapes, such as, for example, trapezoidal, triangular, and others. Two fringe images have been used in the illustrated embodiments. However, a larger number of fringe images may also be used. Also, phase shift and fringe period may vary within the same application and between applications. Furthermore, the uniform fringe image may possess intensity different from the average intensity adopted in embodiments of the invention. In some embodiments, there may be no uniform fringe projection.

A marker encoded to assist in determining absolute coordinates can have various shapes, such as, for example, a line, circle, or an ellipse. Several markers can be projected simultaneously with each illumination pattern. Also, the marker can be generated by an additional device (e.g., a laser pointer).

The multi-level quality guided phase unwrapping algorithm divides the quality map into multiple levels and unwraps each levels using an efficient method. The quality map can be of various nature and is not limited to the one illustrated. For instance, a data modulation map, first gradient of the wrapped phase map, and variance of the wrapped phase map can be used as quality maps. Analogously, a fast phase unwrapping algorithm is not limited to the scan-line algorithm introduced in illustrated embodiments. Therefore, other fast algorithms, such as, for example, a flood fill algorithm, can potentially be employed.

With the advancement of GPU technology, more powerful GPU shaders designed to be built into the graphics card will become available. In embodiments of the invention, a GPU vertex shader is used to assist in absolute coordinate computation. It should be understood that other possibilities exist. Thus, pixel shaders, geometry shaders or other type of shaders can be utilized within the GPU to realize the functionality of the vertex shader. It should be appreciated that the absolute coordinates can optionally be stored within a memory of the GPU for future use.

Further, as the pace of the progress in developing advanced CPU technologies accelerates, CPUs can potentially become powerful enough to carry out the calculations executed by a GPU in illustrated embodiments.

It should also be appreciated that the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of determining absolute coordinates of a three-dimensional surface of an object, the method comprising:
    projecting only two phase-shifted illumination patterns, wherein each of the illumination patterns encodes a marker, onto the surface of the object;
    projecting a uniform illumination pattern onto the surface of the object;
    capturing images of reflections of the illumination patterns from the surface of the object, including a black and white texture of the object surface;
    combining the captured images as to generate a phase-wrapped image;
    generating a relative unwrapped phase image by unwrapping the phase-wrapped image;
    generating an absolute phase image from the relative unwrapped phase image; and
    determining absolute coordinates of the surface of the object from the absolute phase image as well as surface texture of the object at said coordinates.

2. The method of claim 1, wherein capturing the images of the reflections of the illumination patterns comprises capturing said images in a black and white mode and in a color mode.

3. The method of claim 2, further including projecting a uniform illumination pattern, wherein a color texture of the surface of the object is captured simultaneously with determining the absolute coordinates of the surface of the object, using an image of a reflection from the surface of the object of the uniform illumination pattern captured in the color mode.

4. The method of claim 1, wherein capturing the black and white texture includes removing the encoded marker from the captured image of the uniform illumination pattern.

5. The method of claim 3, wherein capturing the color texture includes removing the encoded marker from the captured image of the uniform illumination pattern.

6. The method of claim 4, wherein the illumination patterns are color encoded.

7. The method of claim 5, wherein the illumination patterns are color encoded.

8. The method of claim 1, wherein phase unwrapping comprises:
generating a quality map;
dividing the quality map into multiple quality levels; and
applying a phase unwrapping algorithm to each of the levels separately, in order of decreasing quality.

9. The method of claim 8, wherein generating the quality map comprises generating a gradient map of the phase-wrapped image.

10. The method of claim 8, wherein generating the quality map comprises generating a variance map of the phase-wrapped image.

11. The method of claim 10, wherein the phase unwrapping algorithm is a fast scan-line phase unwrapping algorithm.

12. The method of claim 1, wherein the two phase-shifted illumination patterns are separated by approximately 90 degrees of phase shift.

13. The method according to claim 12, wherein generating the two phase-shifted illumination patterns comprises generating only two phase-shifted illumination patterns.

14. The method according to claim 1, wherein generating the two phase-shifted illumination patterns comprises generating only two phase-shifted illumination patterns.

15. The method of claim 1, wherein generating the absolute phase image from the relative unwrapped phase image includes detecting a phase of the encoded marker and adjusting the relative unwrapped phase image according to the detected phase of the encoded marker.

16. An apparatus for determining absolute coordinates of a three-dimensional surface of an object, the apparatus comprising:
at least one illumination pattern generator for generating only two phase-shifted and one uniform illumination patterns, wherein each of the illumination patterns encodes a phase marker;
at least one projection device for projecting the illumination patterns onto the surface of the object;
at least one imaging device for capturing images of reflections of the illumination patterns from the surface of the object; and
at least one image processor for processing the captured images to determine the surface texture of the object and the absolute coordinates of the surface of the object as a function of a decoded phase of the marker.

17. The apparatus of claim 16, wherein the at least one projection device is synchronized with the at least one imaging device.

18. The apparatus of claim 16, wherein the at least one illumination pattern generator and the at least one image processor are part of an integral unit.

19. The apparatus of claim 16, wherein the at least one image processor is adapted and configured, when processing the captured images, to:
combine the captured images as to generate a phase-wrapped image;
generate a relative unwrapped phase image by unwrapping the phase-wrapped image;
generate an absolute phase image from the relative unwrapped phase image; and
determine absolute coordinates of the surface of the object from the absolute phase image.

20. The apparatus of claim 19, wherein the at least one imaging device comprises at least one imaging device capturing images in a black and white mode and at least one imaging device capturing images in a color mode.

21. The apparatus of claim 20, wherein the at least one imaging device capturing images in the black and white mode and the at least one imaging device capturing images in the color mode operate independently and in synchronization.

22. The apparatus of claim 21, wherein the illumination patterns are color encoded patterns, and the images of the reflections of the patterns are captured in the black and white mode.

23. The apparatus of claim 20, wherein the illumination patterns are color encoded patterns, and the images of the reflections of the patterns are captured in the black and white mode and in the color mode.

24. The apparatus of claim 22, wherein a black and white texture of the surface of the object is captured simultaneously with determining the absolute coordinates of the surface of the object, using the image of the reflection of the uniform illumination pattern.

25. The apparatus of claim 23, wherein a color texture of the surface of the object is captured simultaneously with determining the absolute coordinates of the surface of the object, using the image of the reflection of the uniform illumination pattern, and wherein the image was captured in the color mode.

26. The apparatus of claim 24, wherein capturing the black and white texture includes removing the encoded marker from the image of the uniform illumination pattern.

27. The apparatus of claim 25, wherein capturing the color texture includes removing the encoded marker from the captured image of the uniform illumination pattern.

28. The apparatus of claim 19, wherein the at least one image processor, is configured and arranged, when phase unwrapping, to:
generate a quality map;
divide the quality map into multiple quality levels; and
apply a phase unwrapping algorithm to each of the levels separately, in order of decreasing quality of data points in the levels.

29. The apparatus of claim 28, wherein the at least one image processor when generating the quality map comprises generating a gradient map of the phase-wrapped image.

30. The apparatus of claim 28, wherein the at least one image processor when generating the quality map comprises generating a variance map of the phase-wrapped image.

31. The apparatus of claim 28, wherein the phase unwrapping algorithm is a fast scan-line phase unwrapping algorithm.

32. The apparatus of claim 16, wherein the two phase-shifted illumination patterns are separated by approximately 90 degrees of phase shift.

33. The apparatus of claim 18, wherein generating the absolute phase image from the relative unwrapped phase image includes detecting a phase of the encoded marker and adjusting the relative unwrapped phase image according to the detected phase of the encoded marker.

34. The apparatus of claim 16, wherein generating the two phase-shifted illumination patterns comprises generating only two phase-shifted illumination patterns.

35. The apparatus of claim 19, wherein determining the absolute coordinates of the surface of the object from the absolute phase image is performed by a graphics processing unit.

* * * * *